(12) United States Patent
Zhou et al.

(10) Patent No.: US 6,441,087 B1
(45) Date of Patent: Aug. 27, 2002

(54) HIGH GLOSS ACRYLIC COATINGS WITH IMPROVED IMPACT RESISTANCE

(75) Inventors: Lichang Zhou, Hattiesburg; Oliver Wendell Smith, Petal, both of MS (US); Thomas Clayton Forschner, Richmond, TX (US); Wyndham Henry Boon, North Canton, OH (US); David Eric Gwyn, Houston, TX (US); Shelby Freland Thames, Hattiesburg, MS (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/671,572

(22) Filed: Sep. 27, 2000

Related U.S. Application Data
(60) Provisional application No. 60/160,340, filed on Oct. 19, 1999.

(51) Int. Cl.[7] .............................................. C08L 75/00
(52) U.S. Cl. ........................................ 524/590; 528/85
(58) Field of Search .............................. 524/590; 528/85

(56) References Cited

U.S. PATENT DOCUMENTS

| | | | |
|---|---|---|---|
| 3,691,258 A | 9/1972 | Riemhofer et al. | 260/850 |
| 4,533,729 A | 8/1985 | Newland et al. | 528/371 |
| 4,548,998 A | 10/1985 | Chang et al. | 525/441 |
| 5,212,321 A | 5/1993 | Muller et al. | 549/228 |
| 5,219,663 A | 6/1993 | Kohno et al. | 428/525.9 |
| 5,464,921 A * | 11/1995 | Laas | 528/67 |
| 5,527,879 A | 6/1996 | Nakae et al. | 528/371 |
| 5,569,707 A | 10/1996 | Blum et al. | 524/591 |
| 5,621,064 A * | 4/1997 | Laas | 528/60 |
| 6,306,967 B1 * | 10/2001 | Spyrou | 525/131 |

FOREIGN PATENT DOCUMENTS

| | | | |
|---|---|---|---|
| EP | 0416501 A2 | 3/1991 | |
| EP | 0579503 A2 | 1/1994 | |
| JP | 4001724 A | 1/1989 | C08G/64/30 |
| JP | 95116284 B2 | 12/1995 | C08G/64/30 |
| JP | 08269394 A | 10/1996 | C09D/175/04 |
| JP | 11080608 A | 3/1999 | C09D/5/003 |

OTHER PUBLICATIONS

Database WPI Week 8910 Derwent Publication Ltd., London, G.B., AN 1989–072679 XP002159867 & JP 01 024817A Jan. 26, 1989, Feb. 20, 2001.

International Search Report of Feb. 20, 2001.

* cited by examiner

*Primary Examiner*—Paul R. Michl

(57) ABSTRACT

Disclosed is an acrylic polyurethane coating composition characterized by improved impact resistance and high gloss and produced by reacting a polyol, optionally a catalyst, and a polyisocyanate crosslinking agent, wherein the polyol is substituted with 2 to 50% by weight of a polytrimethylene carbonate diol or triol.

25 Claims, 12 Drawing Sheets

HIGH GLOSS ACRYLIC COATINGS WITH IMPROVED IMPACT RESISTANCE

This application claims the benefit of U.S. Provisional Application No. 60/160,340, filed Oct. 19, 1999, the entire disclosure of which is hereby incorporated by reference.

CROSS REFERENCE

This application is related to U.S. patent application Ser. No. 60/160,339 filed of even date, and incorporated by reference herein in the entirety.

FIELD OF INVENTION

This invention relates to acrylic polyurethane coating compositions and, in particular, to an improved acrylic polyurethane coating composition. More particularly, this invention relates to the incorporation of polytrimethylene carbonate diols and triols into acrylic polyurethane coatings to obtain high gloss acrylic coatings with improved impact resistance, with no significant loss of other properties.

BACKGROUND OF THE INVENTION

Acrylic polyurethane coating compositions are well known and have been widely used to finish and repair finishes on automobiles and trucks. An early high quality acrylic polyurethane coating composition which has been widely used is described in U.S. Pat. No. 3,558,564. Other acrylic polyurethane compositions are described in U.S. Pat. Nos. 4,131,571 and 4,555,535.

Though these acrylic polyurethane coatings provided improvements over any coatings previously available, problems with paint chipping continue to plague motor vehicle owners. There is a need in the art for compositions with improved impact resistance. Attempts have been made to produce tougher, more chip-resistant paint for automobiles, but these have not been completely satisfactory. One recognized alternative solution is to cover all or parts of the finished surface of the automobile with a protective coating, however the acrylic enamel, acrylic lacquer, or nitrocellulose lacquer typically used on vehicles produce coatings which are difficult to overcoat with protective materials.

A useful protective coating composition would first and foremost be chip- and abrasion-resistant, have good adhesion to the painted surface, be clear, smooth (i.e., without surface roughness) and indistinguishable over the painted surface when applied to the areas being protected.

Various attempts have been made to produce chip-resistant polyurethane protective coatings. See, for example, U.S. Pat. No. 4,254,168. Another example is U.S. Pat. No. 3,875,090 which discloses a high impact and abrasion resistant coating composition comprising a mixture of a partially hydrolyzed vinyl chloride-vinyl acetate copolymer, an alkyd and an isocyanate terminated urethane prepolymer.

Thermosetting compositions characterized by hardness as well as flexibility have been disclosed in the art. U.S. Pat. No. 3,691,258 claims coating compositions resistant to yellowing, solvents, acids, and alkalies, and having the combination of high elasticity and good hardness produced from a mixture of an aminoplast, a polyester, and a mixture which includes one or both of ethylene glycol and 1,2-propanediol, optionally an additional diol component, and an acid mixture which consists essentially of a cyclic dicarboxylic acid and an acyclic dicarboxylic acid. U.S. Pat. No. 4,548,998 discloses an improved high solids, solvent-based, thermosetting coating composition useful on surfaces containing rigid as well as elastomeric substrates in combination, comprising about 60 to 95% by weight acyclic moieties, and optionally up to about 30% by weight cyclic moieties. The preparation of this polyurethane polyol does not entail the use of a polyisocyanate.

The use of various modifiers to attempt to improve impact properties of acrylic polyurethanes has been addressed in the art. Polytrimethylene ether glycol(PTMEG) has been suggested as a modifier for polyurethanes, however at the expense of optimum UV resistance. The addition of glycol adipates to improve impact resistance has been suggested, but results in the reduction of hydrolytic stability. Previously proposed impact modifiers typically result in the loss of other properties.

The preparation of polycarbonate polyols is known in the art. U.S. Pat. No. 4,533,729 discloses a process for preparing amorphous polycarbonate polyols by reacting phosgene, a branched-chain polyhydric alcohol, and a straight chain polyhydric alcohol in the presence of a solvent and in the absence of a catalyst at a temperature of from about 60° to 100° C. The reaction mixture is then contacted with a catalytic amount of a tertiary amine at reflux temperature for a period of time of at least about 30 minutes. It is suggested the resulting polycarbonate polyol can be used in coating compositions. In JP 64001724 there is disclosed the preparation of a polycarbonate polyol from (di) allyl-, alkyl- or alkylene carbonate and a polyhydroxy compound using a titanium catalyst.

The use of a polycarbonate in a polyurethane composition is known. U.S. Pat. No. 5,569,707 discloses aqueous polyester-polyurethane dispersions which are aqueous binders suitable for use in flexible lacquer, coating and sealing compositions, and, in particular, for the production of soft feel coatings. These compositions include 4–75% of a difunctional polyol which can be a polycarbonate. Another reference, U.S. Pat. No. 5,527,879, discloses a coating composition containing a polycarbonate polyol and a melamine resin curing agent which is claimed to provide good solubility in solvent, high compatibility with curing agent, preferred heat and water resistance and good dynamic and physical properties. In U.S. Pat. No. 5,219,663 there is disclosed an aromatic polycarbonate polyurethane resin suitable as a coating agent or film on a magnetic layer of a magnetic recording medium.

JP 08269394A discloses an intermediate coating paint composition containing a polyurethane resin, a polycarbonate diol, a polyisocyanate and a microgel.

The preparation of trimethylene carbonate is known. U.S. Pat. No. 5,212,321 discloses a process for preparing trimethylene carbonate wherein 1,3-propanediol is reacted with diethylcarbonate in the presence of zinc powder, zinc oxide, tin powder, tin halide or organo-tin compound, at an elevated temperature. It is also known in the art to use polytrimethylene carbonate in polyester applications. See U.S. Pat. Nos. 5,225,129 and 5,849,859.

There does not appear to be any reference in the art which discloses or suggests the use of polytrimethylene carbonate diols and triols in relatively small amounts to provide improved impact resistance in acrylic polyurethane compositions.

There is still a need in the art for an acrylic polyurethane coating composition with improved impact resistance. It would be extremely valuable if it were possible to provide improved impact resistance without diminishing or sacrificing any other properties, particularly gloss.

SUMMARY OF THE INVENTION

In the present invention it has been found that modified acrylic polyurethane coatings with high impact resistance and high gloss can be achieved through incorporation of polytrimethylene carbonate diols and triols. Furthermore, these improvements were observed while maintaining high gloss, weather resistance, and overall durability. It has surprisingly been found that to have both high impact resistance and high gloss polytrimethylene carbonate diols and triols within a specific molecular weight range provide the best results.

In accordance with the foregoing, the present invention comprises: A curable modified acrylic polyurethane coating composition characterized by improved impact resistance which comprises:

a) An acrylic polyol dissolved in a suitable solvent to 40–90% solids;

b) 2 to 50% by weight of said acrylic polyol substituted with a polytrimethylene carbonate polyol selected from a polytrimethylene carbonate diol, a polytrimethylene carbonate triol, or a higher functionality polytrimethylene carbonate polyol; and c) A polyisocyanate crosslinking agent;

d) Optionally a catalyst; and e) Optionally pigments and other additives commonly used in coatings.

The composition can be applied over a wide variety of substrates such as plastic, metal, wood, primed metals, or previous coated or painted metals.

DETAILED DESCRIPTION OF THE INVENTION

Figure 1:
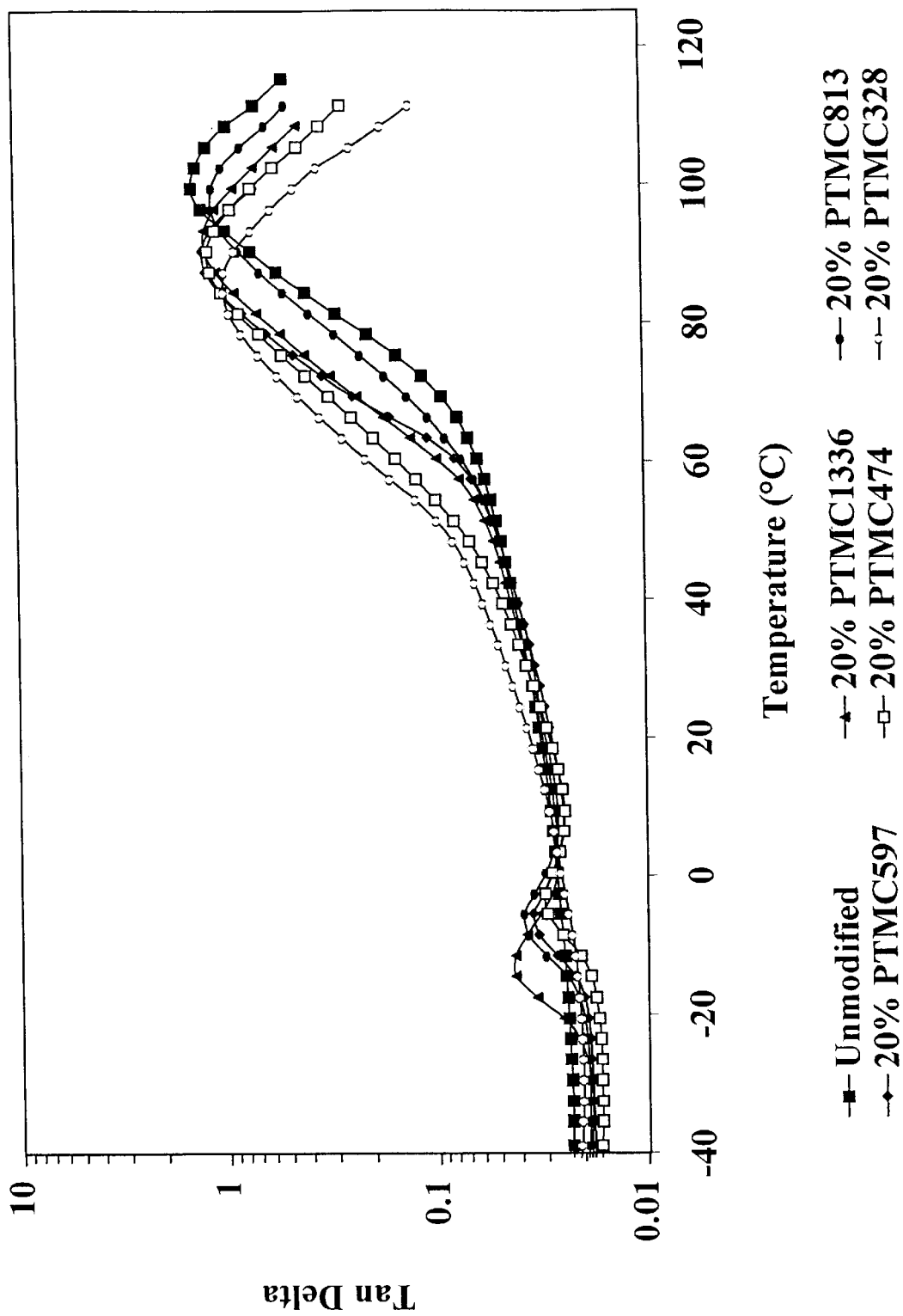
FIG. 1 is a graph of the damping-temperature curve of 20% PTMC diols modified polyurethane coatings.

In the present invention we have discovered a method of making an acrylic polyurethane coating composition characterized by improved impact resistance with minimal effect on other critical properties. Polytrimethylene carbonate polyols (PTMC polyols) were examined as acrylic polyurethane modifiers in the present invention. Polytrimethylene carbonate has been used as a modifier in polyester applications, however when polytrimethylene carbonate is incorporated into acrylic polyols as a potential polyurethane coatings modifier, problems can be observed with phase separation, hazy coating appearance, and reduced gloss. In the present invention it has surprisingly been found that the use of low percentages of polytrimethylene carbonate diols and triols circumvent these problems and provide distinct improvements in key properties of the cured compositions.

The PTMC diols and triols in the formulations examined herein provide greatly improved flexibility for acrylic urethane coatings under both ambient and low temperature test conditions, reduce the viscosity of the urethane coatings formulated with selected commercial polyols, and maintain other properties such as pencil hardness, adhesion, and chemical and stain resistance, as well as water resistance.

The PTMC polyol content in the formulations strongly affected the coating properties. In order to observe the maximum benefits of the PTMC polyol with respect to high impact resistance and high gloss the PTMC polyol is preferably within a particular molecular weight range and functionality. It was found that the compatibility of PTMC polyol with acrylic copolymer could be greatly improved by lowering the carbonate molecular weight, increasing PTMC polyol functionality, reducing the content in formulations, and increasing curing temperatures.

PTMC diols with equivalent weights ranging from 324 to 1336 and PTMC triols with equivalent weights ranging from 121 to 573 were evaluated as reactive modifiers for polyurethane coatings. The effect of curing conditions, PTMC polyol molecular weights, and level used in the formulation on coating properties were evaluated. In comparison with higher molecular weight PTMC polyols, PTMC diols and triols with lower molecular weights were more compatible with the acrylic polyol had less tendency to crystallize.

Dynamic mechanical analysis showed that the compatibility of PTMC polyols with acrylic polyols decreased with increasing PTMC polyol molecular weight and content in the formulations.

The acrylic polyurethane coating composition of the present invention requires a polyol, a PTMC diol or triol, a solvent, optionally a co-solvent, an isocyanate, and optionally a urethane catalyst.

A variety of polyols can be used, including, but not limited to, polyether polyols, polyurethane polyols, acrylic polyols, and polyester polyols.

The acrylic polymers are copolymers of one or more alkyl esters of acrylic acid or methacrylic acid optionally together with one or more other polymerizable ethylenically unsaturated monomers. These polymers are generally of the thermosetting crosslinking type. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such acrylonitrile and methacrylonitrile; vinyl and vinylidene halides such as vinyl chloride and vinylidene fluoride and vinyl esters such as vinyl acetate. Acrylic polymers can be prepared via aqueous emulsion polymerization techniques or can be prepared via organic solution polymerization techniques. Generally, any method of producing such polymers that is known to those skilled in the art utilizing art recognized amounts of monomers can be used.

Suitable functional monomers may be used in addition to the other acrylic monomers mentioned above for crosslinking purposes and include, for example, acrylic acid, methacrylic acid, hydroxyalkyl acrylates, and hydroxyalkyl methacrylates. Preferably, the hydroxyalkyl group of the latter two types of compounds contains from about 2 to 4 carbon atoms. Examples thereof are hydroxyethyl acrylate, hydroxyethyl methacrylate, hydroxypropyl acrylate, hydroxypropyl methacrylate, 4-hydroxybutyl acrylate and 4-hydroxybutyl methacrylate and the like. Also, the acrylic polymer can be prepared with N-(alkoxymethyl)acrylamides and N-(alkoxymethyl)methacrylamides.

The polymeric film-forming resin for the composition can also be selected from suitable polyesters. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylolpropane, pentaerythritol, 1,3-propanediol, and 2-methyl-1,3-propanediol.

Suitable dicarboxylic acids are known to those skilled in the art and include terephthalic acid, isophthalic acid, succinic acid, adipic acid, azelaic acid, sebacic acid, maleic acid, fumaric acid, phthalic acid, tetrahydrophthalic acid, hexahydrophthalic acid, dodecanedioic acid, and trimellitic acid. In addition to the polycarboxylic acids mentioned above, functional equivalents of the acids, such as anhydrides, where they exist, or lower alkyl esters of the acids, such as the methyl esters, may be used.

Acrylic polyols are preferred for optimum results. Suitable acrylic polymers have an equivalent weight of about 300 to 1300 and a hydroxyl value of 70 to 187. Preferably, the acrylic polymer has an equivalent weight of about 400 to 700 and a hydroxyl value of 80 to 140.

Suitable acrylic polyols are, for example, SCX 902, SCX 912, and Joncryl® 587, commercially available from S. C. Johnson Polymer. A suitable polyester polyol was, for example, Desmophen 670A, commercially available from Bayer Corporation.

The acrylic polyol used in the examples to demonstrate the benefits of the PTMC diols and triols was Joncryl® 587 polyol, commercially available from S. C. Johnson®. Joncryl® 587 typically has a hydroxyl number of 94, an equivalent weight of 600, an acid number <5, and a glass transition temperature of 50° C. Joncryl®587 is a solid flaked acrylic polyol designed for use in urethane coatings at conventional solids. Joncryl®587 allows the formulator to select the solvent and the optimized equivalent weight of this product results in a low isocyanate demand with sufficient crosslink density to provide good chemical and solvent resistance.

Suitable isocyanates useful in making the coating composition are aliphatic, aromatic or cycloaliphatic polyisocyanates. The isocyanates can include diisocyanates and triisocyanates. Examples of suitable isocyanates include: isophorone diisocyanate, diphenylmethane4,4'-diisocyanate, diphenylene4-4'-diisocyanate, toluene-2,4-diisocyanate, toluene-2,6-diisocyanate, 3,3'-dimethoxy-4-4'-diphenylene diisocyanate, methylene-bis-(4-cyclohexylisocyanate), tetramethylene diisocyanate, hexamethylene diisocyanate, decamethylene diisocyanate, ethylene diisocyanate, ethylidene diisocyanate, propylene-1,2-diisocyanate, cyclohexylene-1,2-diisocyanate, m-phenylene diisocyanate, p-phenylene diisocyanate, 3,3'-dimethyl4,4'-biphenylene diisocyanate, 3,3'-dimethoxy4,4'-biphenylene diisocyanate, 3,3'-diphenyl4,4'-biphenylene diisocyanate, 4,4'-biphenylene diisocyanate, 3,3'-dichloro4,4'-biphenylene diisocyanate, furfurylidene diisocyanate, xylylene diisocyanate, -diphenyl propane4,4'-diisocyanate, bis-(2-isocyanatoethyl)fumarate, 1,3,5-benzene triisocyanate, para, para',para"-triphenylmethane triisocyanate, and 3,3'-diisocyanatodiphropy ether, and combinations thereof.

The preferred isocyanates were aliphatic and cycloaliphatic isocyanates. The isocyanates employed in the examples to demonstrate the benefits of the invention were trifunctional. These trifunctional isocyanates are commercially available under the tradename Tolonate® Polyisocyanates from Rhone-Poulenc.

Suitable solvents for use in the invention are those which do not react with isocyanates. This includes a number of conventional solvents, however PTMC diols were not soluble in aliphatic or aromatic hydrocarbon solvents, such as, for example, hexane, toluene, xylene, etc. Examples of solvents which are generally suitable include, but are not limited to, esters such as butyl acetate, n-propyl acetate, and ethylene glycol diacetate; ketones such as methyl ethyl ketone, methyl n-propyl ketone, and methyl amyl ketone; and ethers such as propylene glycol methyl ether acetate and ethylene glycol methyl ether acetate. The preferred solvents were glycol ethers and/or esters with no hydroxyl groups, particularly propylene glycol methyl ether acetate (PGMA), which is also a good solvent for acrylic polyols. It was also desirable to incorporate a co-solvent to improve the solubility and evaporation rate for coatings applications.

In order to formulate the modified coatings, the acrylic polyol was dissolved in a suitable solvent to about 40–70%, preferably 50–60% solids. The PTMC diols and triols were dissolved in the same solvent, typically PGMA and a co-solvent to improve solubility and evaporation rate for the coating composition, to about 40–70%, preferably 50–60% solids. The PTMC diols and triols were incorporated into the formulation at 5, 10, 20 and 50% levels, based on the weight of polyols. Coatings formulations were prepared by combining the polyols with a multifunctional isocyanate. The total NCO to OH ratio was in the range of 1.2:1 to 1:1. The preferred NCO: OH ratio was about 1.1:1.

Suitable co-solvents include, but are not limited to, methyl ethyl ketone, methyl n-propyl ketone, acetone, ethyl acetate, and tertiary butyl acetate. The preferred co-solvent was methyl ethyl ketone (MEK). About 0 to 40% of the primary solvent used in the formulations was substituted with co-solvent, preferably from about 10 to 30%.

The coatings can be cured or crosslinked without the use of catalyst. However, it is optional to use a conventional catalyst to promote the crosslinking reaction of the polyisocyanate with the acrylic polyols. Suitable catalysts include alkali metal hydroxides or alkaline earth metal hydroxides, alkali metal carbonates, alkaline earth metal carbonates, alkali metal alcoholate organometal compounds such as stannous octoate, di-n-butyltin diacetate, di-n-butyltin laurate, di-n-butyltin mercaptide, di-n-butyltin thiocarboxylate, di-n-butyltin maleate, dioctyltin captide, dioctyltin thiocarboxylate, dioctyltin maleate, acryloxytri-n-butyltin, acryloxytriphenyltin, allyltri-n-butyltin, allyltrimethyltin, allyltriphenyltin, bis(2-ethylhexanoate)tin, bis(neodecanoate)tin, bis(tri-n-butylstannyltin)acetylene, bis(tri-n-butyltin)acetylene dicarboxylate, bis(triphenyltin) oxide, n-butyltin hydroxide oxide, n-butyltris(2-ethylhexanoate)tin, cyclopentadienyltri-n-butyltin, 1,3-diacetoxy-1,1,3,3-tetrabutyltin oxide, diallyl-di-n-butyltin, di-n-butylbis(2-ethylhexanoate)tin, di-n-butylbis(2-ethylhexylmaleate)tin, di-n-butylbis(methylmaleate)tin, di-n-butylbis(2,4-pentanedionate)tin, di-n- butyldiacetoxytin, di-t-butyldiacrylate tin, di-n-butyl-n-butoxytin, di-n-butyldimethacrylate tin, di-n-butyldimethoxytin, di-n-butyldiacrylate tin, di-n-butyl-S,S'-bis(isooctylmercaptoacetate)tin, di-n-butyltin oxide, di-n-butyltin sulfide, diethyltin oxide, dimethylaminotri-n-butyltin, dimethylaminotrimethyltin, dimethyl-S,S'-bis(isooctylmercaptoacetate)tin, dimethyldineodecanoate tin, dimethylhydroxy(oleate)tin, dimethyltin oxide, dioctyldilaurylate tin, dioctyidineodecanoate tin, dioctyltin oxide, divinyl di-n-butyltin, 1-ethoxyvinyl tri-n-butyltin, ethynyltri-n-butyltin, methacryloxytri-n-butyltin, phenylethynyltri-n-butytin, phenyltri-n-butyltin, tetraacetoxytin, tetraallyltin, tetra-t-butoxytin, tetra-n-butyltin, tetraethyltin, tetraisopropoxytin-isopropanol adduct, tetraisopropyltin, tetrakis (diethylamino)tin, tetrakis (dimethylamino)tin, tetramethyltin, tetra-n-octyltin, tetra-n-pentyltin, tetraphenyltin, tetravinyltin, tri-n-butylbenzoyloxytin, tri-n-butylethoxytin, tri-n-butylmethoxytin, tri-n-butyltin, vinyltri-n-butyltin, phenylmercurypropionate, and lead octate; monoamines such as triethylamine, and N,N-dimethylcyclohexylamine; diamines such as 1,4-diazabicyclo-2,2,2-octane, N,N,N',N'-tetramethylethylenediamine, N,N,N',N'-tetramethyl propane 1,3-diamine, and N,N,N',N'-tetramethylhexane 1,6-diamine; triamines such as N,N,N',N",N"-pentadimethyl diethylene triamine, N,N,N',N",N"-pentamethyl dipropylene triamine, tetramethyl guanidine; cyclic amines such as triethylene diamine, N,N'-dimethyl piperazine, N-methyl,N'-(2-dimethylamino)ethylpiperazine, N-methylmorphorine, N,(N',N'-diethylaminoethyl)-morphorine, and 1,2-dimethylimidazole; alcohol amines such as dimethylaminoethanol, dimethylaminoethoxyethanol, N,N,N'-trimethylaminoethanolamine, N-methyl-N'-(2-hydroxyethyl)-piperazine, and N-(2-hydroxyethyl) morphorine; etheramines such as bis(2-dimethylaminoethyl) ether ethylene glycol bis(3-dimethyl)-aminopropyl ether; and further salts such as calcium chloride, lithium chloride, lithium bromide, and potassium iodide. It is preferable to use the tin-based organometal complex and organometal salt as a catalyst. These catalysts may be used either alone or in combination. Further, as the kind and amount of the catalyst to be used are variable depending on the kind and amount of the resin and polyvalent organic cyanate, and further the curing conditions, careful selection is necessary to meet the required performance.

For the present invention dibutyltin dilaurate, stannous octoate, dibutyl di(lauryl mercapto)tin, and sodium acetate, etc. provide good results. The catalyst used to demonstrate the invention is dibutyl tin dilaurate. Where an organometallic catalyst was used it was in an amount of about 0.0001 to 0.1% based on the total weight of the resin. The preferred amount of catalyst was about 0.004 to 0.01%, most preferably about 0.006%.

Some of the films were cured at ambient temperatures and some were baked. Where the film was cured at ambient temperature, the curing time could be from several days to several weeks, but was typically one to three weeks, and preferably two to three weeks. Where the film was baked, suitable conditions were 100–160° C., and preferably about 140° C. for up to 60 minutes, preferably about 15–30 minutes, with 20 minutes providing best overall results.

The composition can be applied over a wide variety of substrates such as plastic, metal, wood, primed metals, or previous coated or painted metals. If used to repair an existing finish, the composition is usually applied over an acrylic primer surfacer. The composition can be applied directly to an acrylic lacquer or enamel finish that has been sanded and cleaned with an aliphatic hydrocarbon solvent. The composition can be applied as an original finish over an epoxy primer or other conventional primers or can be applied directly to bare metal. It is preferred to have the metal surface treated with a phosphate.

The coating composition can contain, in addition to the above components, about 0.5–5% by weight, based on the weight of the binder, of ultraviolet light stabilizers, preferably a derivative of benzophenone, benzotriazole.

Other useful ultraviolet light stabilizers are: Benzophenones such as hydroxydodecycl benzophenone, 2,4-dihydroxybenzophenone, hydroxybenzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic monoesters of 2,2',4-trihydroxy-4'-alkoxybenzophenone, 2-hydroxy-4-methoxy-2'-carboxybenzophenone; Triazoles such as 2-phenyl-4-(2'4'-dihydroxybenzoyl)triazoles, substituted benzotriazoles such as hydroxyphenyltriazoles such as 2-(2'-hydroxy-5'-methylphenyl)benzotriazole, 2-(2'-hydroxyphenyl)benzotriazole, 2-(2'-hydroxy-5'-octylphenyl)naphthotriazole; Triazines such as 3,5-dialkyl-4-hydroxyphenyl derivatives of triazine, sulfur-containing derivatives of dialkyl4-hydroxyphenyltriazines, hydroxypheny-1,3,5-triazines and such triazines containing sulfonic acid groups, aryl-1,3,5-triazines, orthohydroxyaryl-s-triazine; Benzoates such as dibenzoate of diphenylolpropane, t-butyl benzoate of diphenylolpropane, nonyl phenyl benzoate, octyl phenyl benzoate, resorcinol dibenzoate.

The coating may also optionally contain color pigments or metallic pigments known to those skilled in the art. Suitable metallic pigments include, for example, aluminum flake, copper bronze flake, and metal oxide coated mica. The coating may also include nonmetallic colored pigments conventionally used in surface coating compositions, including inorganic pigments such as titanium dioxide, iron oxide, chromium oxide, lead chromate, carbon black, and the like, and organic pigments such as phthalocyanine blue and phthalocyanine green.

In general, pigment is incorporated in amounts of about 1 to 80 percent by weight based on weight of coating solids. Metallic pigmentation is employed in amounts from about 0.5 to 35 percent by weight of the aforesaid aggregate weight. If desired, the coating composition may additionally contain other materials well known in the art of formulating surface coatings such as surfactants, flow control agents, thixotropic agents, fillers, anti-gassing agents, and other similar auxiliary additives.

The following examples will serve to illustrate specific embodiments of the invention disclosed herein. These examples are intended only as a means of illustration and should not be construed as limiting the scope of the invention in any way. Those skilled in the art will recognize many variations which may be made without departing from the spirit of the disclosed invention.

EXAMPLE 1

Preparation of PTMC Triols

The preferred results were obtained using PTMC diols and triols. Polytrimethylene carbonate triols were prepared by reacting trimethylene carbonate with trimethylol propane. The trimethylene carbonate and trimethylol propane were weighed and measured into an three-necked flask equipped with a stirring bar. Then the mixture was heated slowly to 120° C. and held at that temperature for about three hours. The contents was then analyzed by GC and NMR for unreacted starting materials. The reaction can be represented by the following:

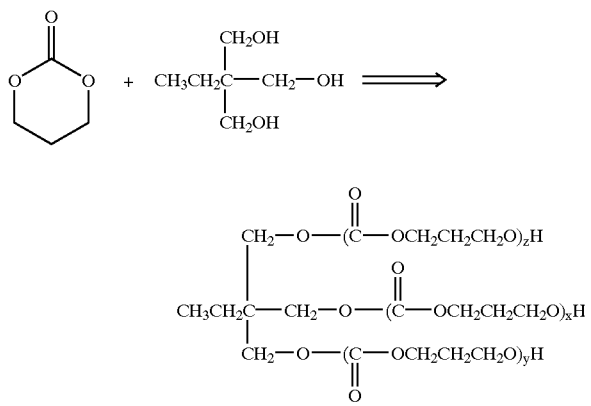

Table 1 shows the amounts of starting materials used to make the PTMC triols and the calculated properties:

TABLE 1

|  | P1 | P2 | P3 |
|---|---|---|---|
| STARTING MATERIALS |  |  |  |
| Trimethylene Carbonate parts | 55 | 75 | 85 |
| Trimethylol Propane | 45 | 25 | 15 |

TABLE 1-continued

|  | P1 | P2 | P3 |
|---|---|---|---|
| CALCULATED PROPERTIES |  |  |  |
| Equivalent Weight | 100 | 180 | 300 |
| Molecular Weight | 300 | 540 | 900 |
| TMC units | 1.6 | 4 | 7.5 |

EXAMPLE 2

A number of diol and triols were prepared. The diols were prepared by reacting PTMC with 1,3-propanediol and the triols were prepared by the procedure discussed in Example 1. Although no catalyst was used in Example 1, the diols and triols can be prepared using, for example, dibutyl tin dilaurate or sodium acetate as a catalyst. In the case of sodium acetate, an effective amount is about 50 ppm. The physical properties of these diols and triols are presented in Table 2. All the diols and triols have very low glass transitions temperatures ($T_g$), which increase as the polyol molecular weights increase. The triols produced a slightly higher $T_g$ than the diols at similar molecular weights. Depending on the molecular weight, PTMC diols were semisolid or very low melting solid which produced a clear liquid upon melting. Differential Scanning Calorimetry (DSC) indicated that the degree of crystallinity increased with increasing molecular weights. Also, the speed of recrystallization was faster as the molecular weight increased for the molecular weights studied.

In comparison with PTMC diols, the triols were clear liquids at room temperature. This characteristic provides the triol solutions with an extra degree of stability, hence regarding the suitability of triols for coating formulations, it is an additional advantage.

TABLE 2

Properties of Polytrimethylene Carbonate Polyols

| PTMC | PC 1336 | PC 813 | PC 597 | PC 474 | PC 328 | PT 573 | PT 445 | PT 308 | PT 217 | PT 121 |
|---|---|---|---|---|---|---|---|---|---|---|
| Functionality | Diol | Diol | Diol | Diol | Diol | Triol | Triol | Triol | Triol | Triol |
| Molecular weight | 2672 | 1626 | 1194 | 948 | 656 | 1718 | 1336 | 924 | 651 | 363 |
| Equivalent Weight | 1336 | 813 | 597 | 474 | 328 | 573 | 445 | 308 | 217 | 121 |
| Tg (° C.) | −25.7 | −30.2 | −35.6 | −40.9 | −46.4 | −26.3 | −28.3 | −35.9 | −38.8 | −48.9 |
| Melting Point (° C.) | 41.7 | 38.4 | 34.8 | 33.4 | 33.3 | — | — | — | — | — |
| Fusion Heat (J/g) | 39.0 | 32.3 | 17.8 | 7.0 | 0.3 | — | — | — | — | — |
| Catalyst, ppmNa or Sn* | 90 Sn | 77 Sn | 54 Sn | 90 Sn | 90 Sn 10 Na | 40 Na | 40 Na | 40 Na | 45 Na | 10 Na |
| Lab Record | 24288 | 23819 | 23819 | 24159 | 24288 | 24288 | 24288 | 24159 | 24159 | 24159 |
| Identification | −63-3 | −48 | −45 | −61 | −83-02 | −94-2 | −94-1 | −93D | −105B | −122C |

*Na, for example, sodium acetate; Sn, for example, tin(II) 2-ethylhexanoate, except PC 813 53 ppm from tin 2-EH and 18 ppm from dibutyltindilaurate

EXAMPLE 3

The purpose of Example 3 was to investigate the solubility of the PTMC diol, PC813 with various solvents. The selection of solvents for the PTMC diols was restricted due to the susceptibility of them to crystallize. The results are shown in Table 3. In Table 3 the word "soluble" means that a clear solution was formed. It was determined that propylene glycol methyl ether acetate (PGMA) solubilized PTMC polyols well and was likewise a good solvent for acrylic polyols. Consequently, a mixture of PGMA and methyl ethyl ketone (MEK) was chosen as solvents for the polyurethane coatings. MEK was utilized as a co-solvent to improve the solubility and evaporation rate for coatings applications.

TABLE 3

Solubility of PC813 in some Conventional Solvents

| Sol-vent | Butyl Acetate | n-Propyl Acetate | Diacetone Alcohol | Methyl Ethyl Ketone | Methyl n-propyl ketone | Methyl Amyl Ketone | Propylene Glycol Methyl Ether Acetate | Ethylene Glycol Methyl Ether acetate | Ethylene Glycol Diacetate | Toluene |
|---|---|---|---|---|---|---|---|---|---|---|
| Room Temp. | I | I | I | S | I | I | S | S | S | I |
| 60° C. | S | S | S | S | S | I | S | S | S | I |
| After Cooling | I | S | S | S | S | I | ¯S | S | S | I |

*Concentration of solutions was 33%.
Abbreviation: I, insoluble; S, soluble

EXAMPLE 4

Joncryl 587, a 100% solids acrylic polyol from S. C. Johnson, was selected as the acrylic polyol for evaluating PTMC diols and triols as reactive modifiers. Joncryl 587 was dissolved in propylene glycol methyl ether acetate to 50% solids. The PTMC diols and triols were dissolved in PGMA and MEK solvents at 50–60% solids. PTMC polyols were incorporated into the formulations at 5, 10, 20 and 50% levels based on the total weight of polyols. Coating formulations were prepared by combining the polyols with a polyisocyanate trimer(Tolonate® HDT-LV from Rhone Poulenc.)

Coating compositions are listed in Table 4 with PC474 as an example. The total NCO to OH ratio was 1.1 to 1 with 0.006% catalyst (dibutyltin dilaurate) based on the total resin weight. Coating formulations had a shelf life of 4–6 hours, which is common for the industrial coating applications. Films were cast on polished or unpolished cold-rolled iron phosphated steel panels (Q Panel S-36, S-36-I, and R-36-I). Films were aged for more than two weeks at ambient temperature before testing, while identical coatings were baked for 20 minutes at 140° C.

TABLE 4

Formulation of PTMC Diol Modified Polyurethane Coatings

| Sample | Control | PC474U05 | PC474U10 | PC474U20 | PC474U50 | PC474 |
|---|---|---|---|---|---|---|
| Modifier Content | 0% | 5% | 10% | 20% | 50% | 100% |
| Joncryl Polyol 50% / PGMA | 50 | 50 | 50 | 50 | 30 | — |
| PC474, 50% MEK | — | 2.63 | 5.56 | 12.5 | 15 | 40 |
| PC474, 50% / PGMA | — | — | — | — | 15 | 10 |
| MEK | 5 | 6 | 5 | 5 | — | — |
| PGMA | — | — | — | 1.8 | — | — |
| Tolonate HDT-LV | 8.39 | 8.95 | 9.57 | 11.04 | 11.40 | 10.62 |
| 2% DBTDL | 0.1002 | 0.1058 | 0.1120 | 0.1269 | 0.1242 | 0.1069 |
| Solid Content | 53% | 52% | 53% | 53% | 58% | 59% |

EXAMPLE 5

The purpose of Example 5 was to determine the compatibility of formulations containing PTMC diols and triols using acrylic polyols from S. C. Johnson Polymer and polyester polyols from Bayer Corporation thermally cured as described in Example 4. Overall compatibility was assessed through visual evaluation of the polymer blend solutions, with propane glycol monomethyl ether acetate (PGMA) and methyl ethyl ketone (MEK) as solvents. Solutions containing 20% PC597 or PC474 were observed visually at room temperature and at 60° C. Then films were cured by application to cold-rolled steel panels. Coating appearance was then visually evaluated. The hazy solutions and/or a hazy film appearance confirmed that two polymers were incompatible. Compatibility was also evaluated through Dynamic Mechanical Analysis (DMA).

The structure of commercial polyols also appeared to influence the compatibility with PTMC diols. For instance, SCX902 and SCX 912 from S. C. Johnson exhibited better compatibility than other acrylic polyols. Some solutions that were hazy at ambient temperature became clear when they were heated to 60° C., indicating improved compatibility at elevated temperatures. Data are shown in Table 5:

TABLE 5

Compatibility Evaluation of PTMC Diol with Commercial Polyols

| Resin | Type | OH Value | Solution Appearance | | | | Coating Appearance | |
|---|---|---|---|---|---|---|---|---|
| | | | Results, 23° C. | | Results, 60° C. | | | |
| | | | PC597 | PC474 | PC597 | PC474 | PC597 | PC474 |
| 1. EPS 3804 | Acr. | 194 | Clear | — | Clear | — | Clear | – |
| 2. SCX 902 | Acr. | 112 | Near Clear | Clear | Clear | Clear | Slightly Hazy | Near Clear |
| 3. SCX 912 | Acr. | 94 | Near Clear | Clear | Near Clear | Clear | Slightly Hazy | Near Clear |
| 4. Joncryl 587, 5% | Acr. | 94 | Near Clear | Clear | Clear | Clear | Clear | Clear |
| 5. SCX 907 | Acr. | 94 | Slightly Hazy | Slightly Hazy | Slightly Hazy | Clear | Hazy | Hazy |
| 6. SCX 920 | Acr. | 140 | Slightly Hazy | Slightly Hazy | Slightly Hazy | Clear | Hazy | Hazy |
| 7. SCX 910 | Acr. | 94 | Slightly Hazy | — | Slightly Hazy | — | Hazy | — |
| 8. Desmophen 670A | PE | 111 | Slightly Hazy | Clear | Clear | Clear | Hazy | Slightly Hazy |
| 9. Desmophen 680 | PE | 70 | Hazy | Clear | Clear | Clear | Hazy | Slightly Hazy |
| 10. Desmophen 650A | PE | 173 | Hazy | Clear | Clear | Clear | Hazy | Slightly Hazy |
| 11. Joncryl 587 10% | Acr. | 94 | Hazy | Slightly Hazy | Slightly Hazy | Clear | Hazy | Slightly Hazy |
| 12. Joncryl 587 20% | Acr. | 94 | Hazy | Hazy | Hazy | Near Clear | Hazy | Hazy |
| 13. SCX 507 | Acr. | 140 | Hazy | Hazy | Slightly Hazy | Near Clear | Hazy | Hazy |
| 14. SCX 804 | Acr. | 43 | Hazy | — | Hazy | — | Hazy | — |
| 15. Desmophen ALS | Acr. | 92 | Hazy | — | Hazy | — | Hazy | — |
| 16. G-cure 114A80 | Acr. | 70 | Hazy | — | Hazy | — | Hazy | — |
| 17. Desmophen A365 | Acr. | 92 | Opaque | — | Hazy | — | Hazy | — |
| 18. Joncryl 587 50% | Acr. | 94 | Opaque | Opaque | Opaque | Opaque | Hazy | Hazy |

Abbreviations: Acr., Johnson Polymer acrylic polyol; PE, Bayer Corporation polyester polyol.

EXAMPLE 6

In Examples 6–14 PTMC polyol modified acrylic coatings are prepared according to the procedure of example 4, except replacing the PC474 with different percent formulations of PC1336, PC813, PC597, PC328 PTMC diol, and PT 573, PT474, PT308, PT217, and PT121 PTMC triol. In Example 6, levels of PTMC polyols of 5, 10, 20, and 50% were added to the acrylic polyol and observed for homogeneity to further investigate the observation in Example 5(Table 5) that hazy solutions of acrylic and PTMC polyols indicated polymer immiscibility. The data confirmed that compatibility increased as the PTMC polyol molecular weights decreased. For example, the blend solution of acrylic polyol with as low as 5% PC1336 was hazy, while the solution containing even 50% of PC328 diol was still clear. For the triol system, the blend containing 5% higher molecular weight PT573 was hazy, whereas the solutions containing 50% of PT121 and PT217 were still clear. The data also revealed that the compatibility of PTMC diol or triol with acrylic polyol decreased as the modifier content in the formulations was increased. However, the polytrimethylene carbonate triols are more compatible than the diols at similar molecular weights, i.e. PC474 and PT308 triol. Results are shown in Table 6:

TABLE 6

Compatibility of Polytrimethylene Carbonate Polyols with an Acrylic Polyol

| PTMC Content | PC1336 | PC813 | PC587 | PC474 | PC328 | PT573 | PT445 | PT308 | PT217 | PT121 |
|---|---|---|---|---|---|---|---|---|---|---|
| 5% | Hazy | Hazy | Slightly Hazy | Clear | Clear | Hazy | Clear | Clear | Clear | Clear |
| 10% | Opaque | Hazy | Hazy | Slightly Hazy | Clear | Hazy | Hazy | Clear | Clear | Clear |
| 20% | Opaque | Opaque | Opaque | Hazy | Clear | Opaque | Hazy | Clear | Clear | Clear |
| 50% | Opaque | Opaque | Opaque | Opaque | Clear | Opaque | Opaque | Slightly Hazy | Clear | Clear |

EXAMPLE 7

In Example 7 different percent formulations containing the different diols and triols, thermally cured as in Example 4, were tested for flexibility in front and reverse impact resistance. The data is shown in Table 7. The data in Table 7 shows that as little as 5% PTMC813, 597, and 328 modifiers provided outstanding improvements in flexibility. In the case of the triol systems, the impact resistance of the modified coatings increased with increasing PTMC molecular weight. However, the highest molecular weight PC1336 diol and PT573 triol provided less improvement in flexibility than lower molecular weight polycarbonates when 5 and 10% modifiers were incorporated. This may be attributed to less compatibility of PC1336 and PT573 with the acrylic polyols.

TABLE 7

Front and Reverse Impact Resistance of PTMC Polyol Modified Urethane Coatings

| PTMC Content | PC1336 (in. lb.) | PC813 (in. lb.) | PC597 (in. lb.) | PC474 (in. lb.) | PC328 (in. lb.) | PT573 (in. lb.) | PT445 (in. lb.) | PT308 (in. lb.) | PT217 (in. lb.) | PT121 (in. lb.) |
|---|---|---|---|---|---|---|---|---|---|---|
| Control | 55/20 | 55/20 | 55/20 | 55/20 | 55/20 | 55/20 | 55/20 | 55/20 | 55/20 | 55/20 |
| 5% | 130/130 | 160/160 | 160/160 | 140/140 | 160/160 | 130/130 | 160/160 | 130/150 | 120/140 | 90/90 |
| 10% | 140/140 | 160/160 | 160/160 | 160/160 | 160/160 | 140/140 | 160/160 | 160/160 | 140/140 | 140/140 |
| 20% | 160/160 | 160/160 | 160/160 | 160/160 | 160/160 | 160/160 | 160/160 | 160/160 | 160/160 | 160/160 |
| 50% | 160/160 | 160/160 | 160/160 | 160/160 | 160/160 | 160/160 | 160/160 | 160/160 | 160/160 | 160/160 |

EXAMPLE 8

In Example 8 improvements in flexibility with modification was further investigated by testing the impact resistance of the formulations of Example 7 at low temperature. The impact tester was placed in a refrigerator and the coated panels were conditioned for 24 hours before testing. The low temperature impact resistance test was carried out at −20° C. The coatings in general had much lower flexibility at low temperature than they usually had at ambient temperature; however, it is evident that PTMC polyol modifiers still provided great improvement in flexibility at low temperature.

TABLE 8

Front and Reverse Impact Resistance of PTMC Polyol Modified Urethane Coatings at Low Temperature

| PTMC Content | PC1336 (in. lb.) | PC813 (in. lb.) | PC597 (in. lb.) | PC474 (in. lb.) | PC328 (in. lb.) | PT573 (in. lb.) | PT445 (in. lb.) | PT308 (in. lb.) | PT217 (1n. lb.) | PT121 (in. lb.) |
|---|---|---|---|---|---|---|---|---|---|---|
| Control | 22/<4 | 22/<4 | 221<4 | 22/<4 | 22/<4 | 22/<4 | 22/<4 | 22/<4 | 22/<4 | 22/<4 |
| 5% | 30/4 | 29/4 | 30/4 | 28/4 | 28/4 | 30/6 | 30/7 | 32/6 | 30/4 | 28/4 |
| 10% | 38/10 | 38/12 | 38/10 | 36/12 | 32/10 | 36/12 | 36/14 | 34/10 | 34/8 | 30/8 |

TABLE 8-continued

Front and Reverse Impact Resistance of PTMC Polyol Modified Urethane Coatings at Low Temperature

| PTMC Content | PC1336 (in. lb.) | PC813 (in. lb.) | PC597 (in. lb.) | PC474 (in. lb.) | PC328 (in. lb.) | PT573 (in. lb.) | PT445 (in. lb.) | PT308 (in. lb.) | PT217 (1n. lb.) | PT121 (in. lb.) |
|---|---|---|---|---|---|---|---|---|---|---|
| 20% | 80/50 | 80/48 | 70/50 | 68/48 | 54/48 | 90/52 | 86/56 | 64/44 | 56/40 | 50/36 |
| 50% | 160/160 | 160/160 | 160/160 | 160/160 | 160/160 | 160/160 | 160/160 | 160/160 | 160/140 | 120/100 |

EXAMPLE 9

In Example 9 the various PTMC diols and triols, thermally cured as in Example 4, were tested in varying percentages for pencil hardness. The ultimate pencil hardness for the PTMC polyol modified coatings did not decrease until 50% modifiers were applied. This is in accordance with the DMA results discussed below. Hardness is most closely related to modulus and it can be thought of as one point modulus determinations. Nevertheless, it is demonstrated that the impact flexibility has been greatly improved. Consequently, such modified coatings provide excellent film hardness and flexibility. Results are shown in Table 9:

TABLE 9

Pencil Hardness of PTMC Polyol Modified Urethane Coatings

| PTMC Content | PC1336 | PC813 | PC597 | PC474 | PC328 | PT573 | PT445 | PT308 | PT217 | P1121 |
|---|---|---|---|---|---|---|---|---|---|---|
| Control | F | F | F | F | F | F | F | F | F | F |
| 5% | F | F | F | F | F | F | F | F | F | F |
| 10% | F | F | F | F | F | F | F | F | F | F |
| 20% | F | F | F | F | F | F | F | F | F | F |
| 50% | HB | B | B | B | B | HB | HB | HB | HB | F |

Dynamic Mechanical Analysis(DMA)

Figure 2:
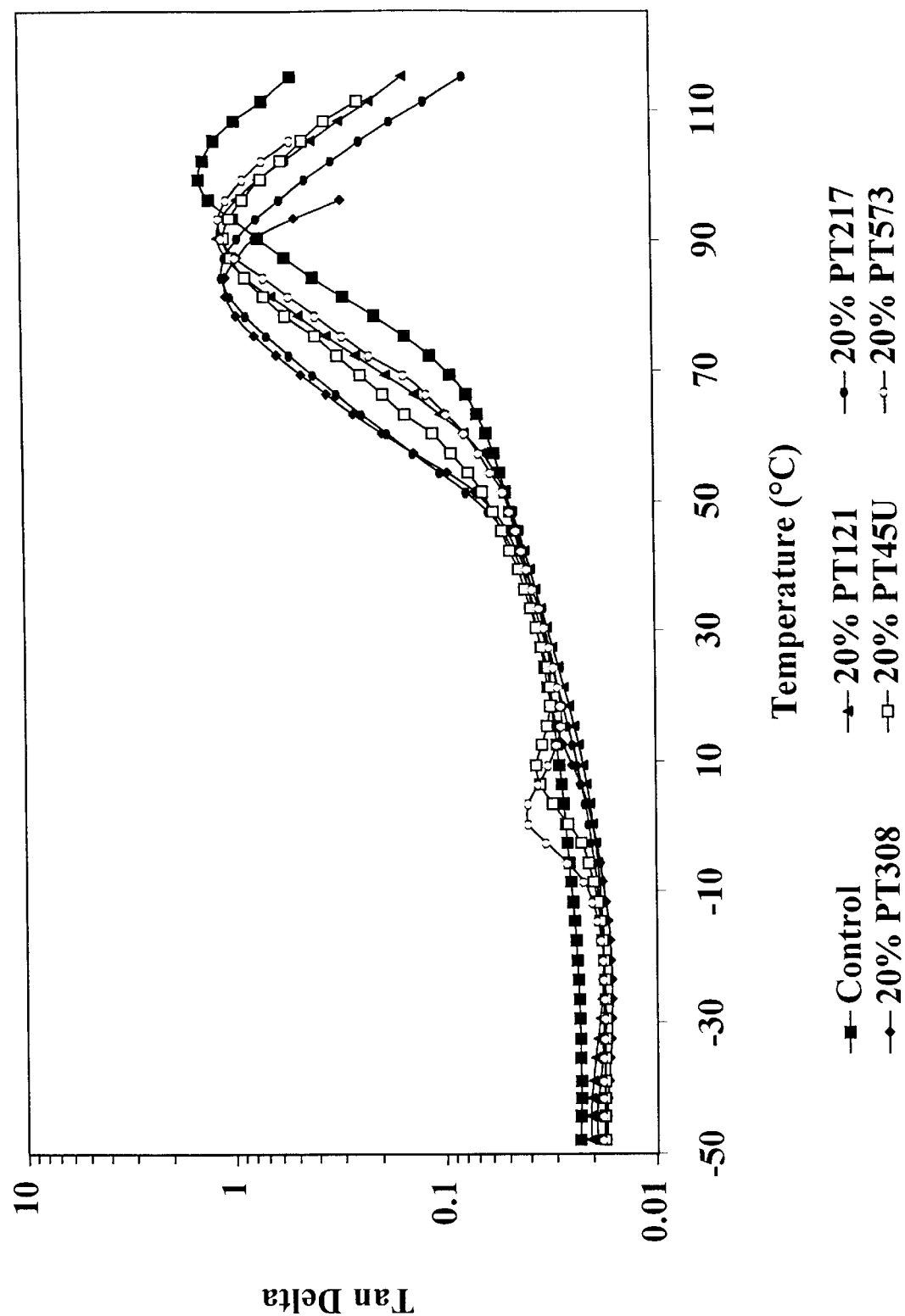
FIG. 2 is a graph of the damping-temperature curve of 20% PTMC triols modified polyurethane coatings.
Figure 3:
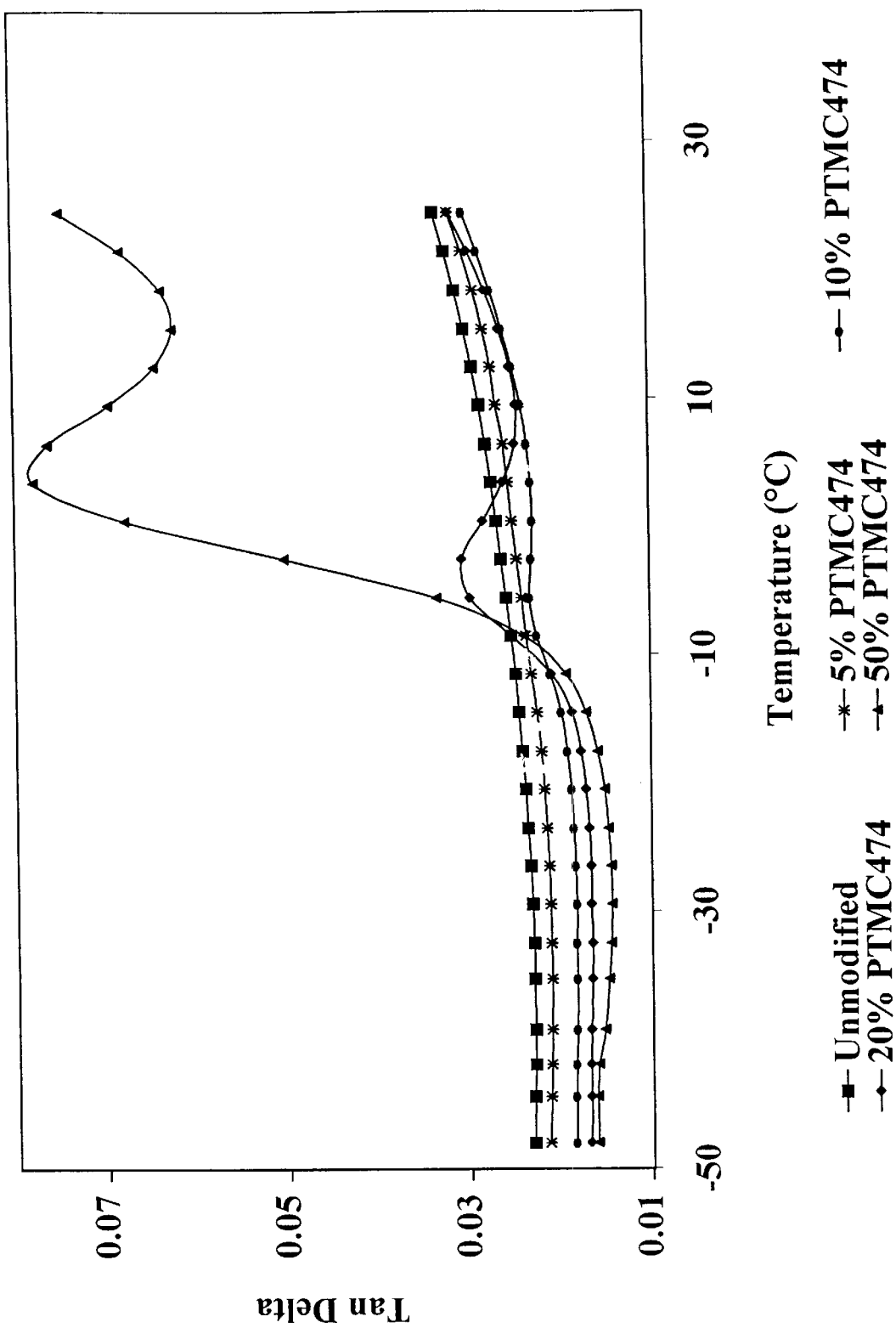
FIG. 3 is a graph of the tan delta versus temperature curves of PC474 with varied content modified coatings.
Figure 4:
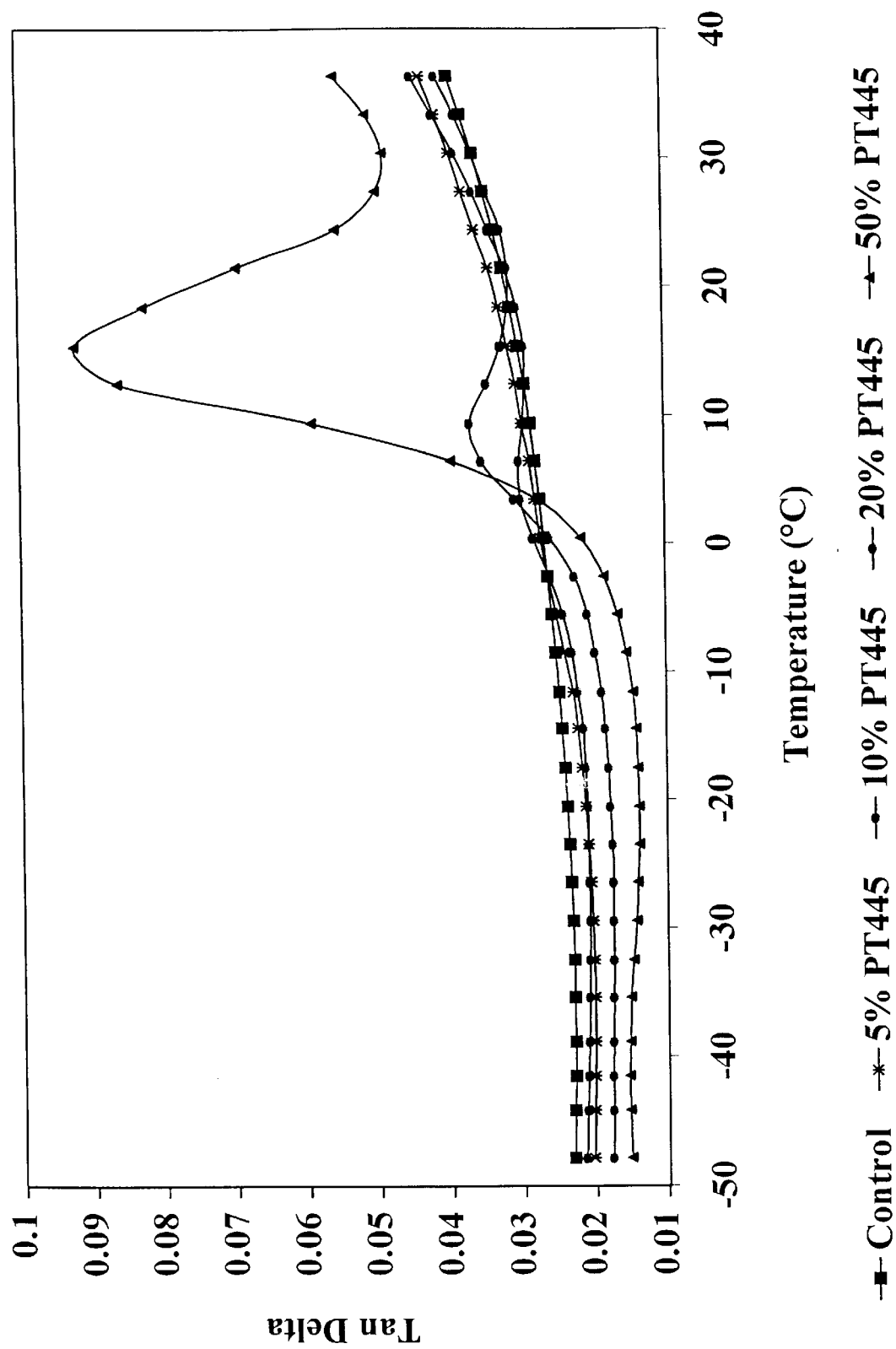
FIG. 4 is a graph of the tan delta versus temperature curves of PT445 with varying contents.

Dynamic mechanical properties were also studied for the diol and triol modified polyurethane coatings. The data are shown as graphs in FIGS. 1 through 12. Dynamic mechanical properties of polymers are especially sensitive to the microstructure of materials. For a two-component system, only one relaxation is shown in a damping-temperature curve when two polymers are compatible. Conversely, a two-phase system shows two peaks. Two separate peaks are clearly visible for both the diols and triols with higher molecular weight modified polyurethane coatings, indicating a phase-separated system and incompatibility. The two peaks correspond to the glass transition temperature of the crosslinked acrylic polyol, the main relaxation at high temperature, and crosslinked PTMC polyol modifiers, the relaxation at low temperature (FIGS. 1 & 2).

The influence of PTMC polyol molecular weights on the dynamic mechanical properties of modified polyurethane coatings was also examined. The amount of PTMC polyols in the formulation also affected the dynamic properties of the modified coatings. Damping versus temperature curves for varying amounts of modifiers PC474 diol and PT445 triol (FIGS. 3 & 4) revealed peaks which increased with increasing the PTMC polyol molecular weights and content in the formulations. These peaks represent relaxation at low temperatures corresponding to the $T_g$ of crosslinked PTMC polyol. No peak was observed with up to 50% PC328 diol, while phase separation occurred with 5% PC 1336. In case of the triols, no peak was present with up to 50% PT121 and PT217, while phase separation occurred when 5% of the higher molecular weight PT573 was used.

The higher the peak, the less compatibility of PTMC with acrylic polyol. It is evident that the peak heights increase with the increase in PTMC polyol molecular weights and concentration in the formulations, indicating a decrease in compatibility of the polytrimethylene carbonate polyols with acrylic polyol. These results are also quite consistent with the conclusions via visual evaluation of the blend solutions. Therefore, DMA studies confirmed that high molecular weight PTMC diols and triols were essentially immiscible with the acrylic polyol thereby giving rise to such effects as hazy appearance and reduced gloss.

Figure 5:
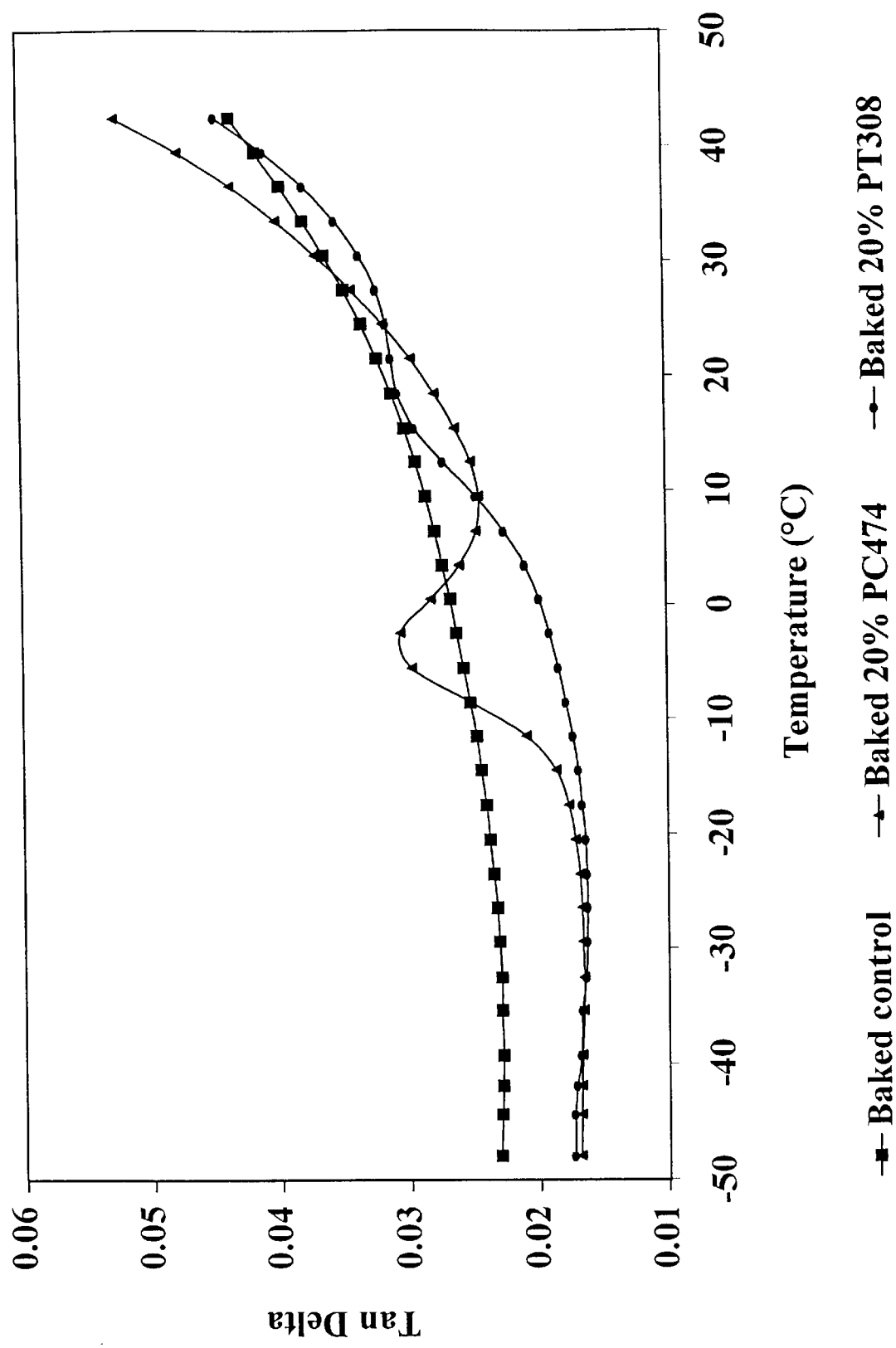
FIG. 5 is a graph of damping-temperature curves of PC474 and PT308 modified coatings.
Figure 6:
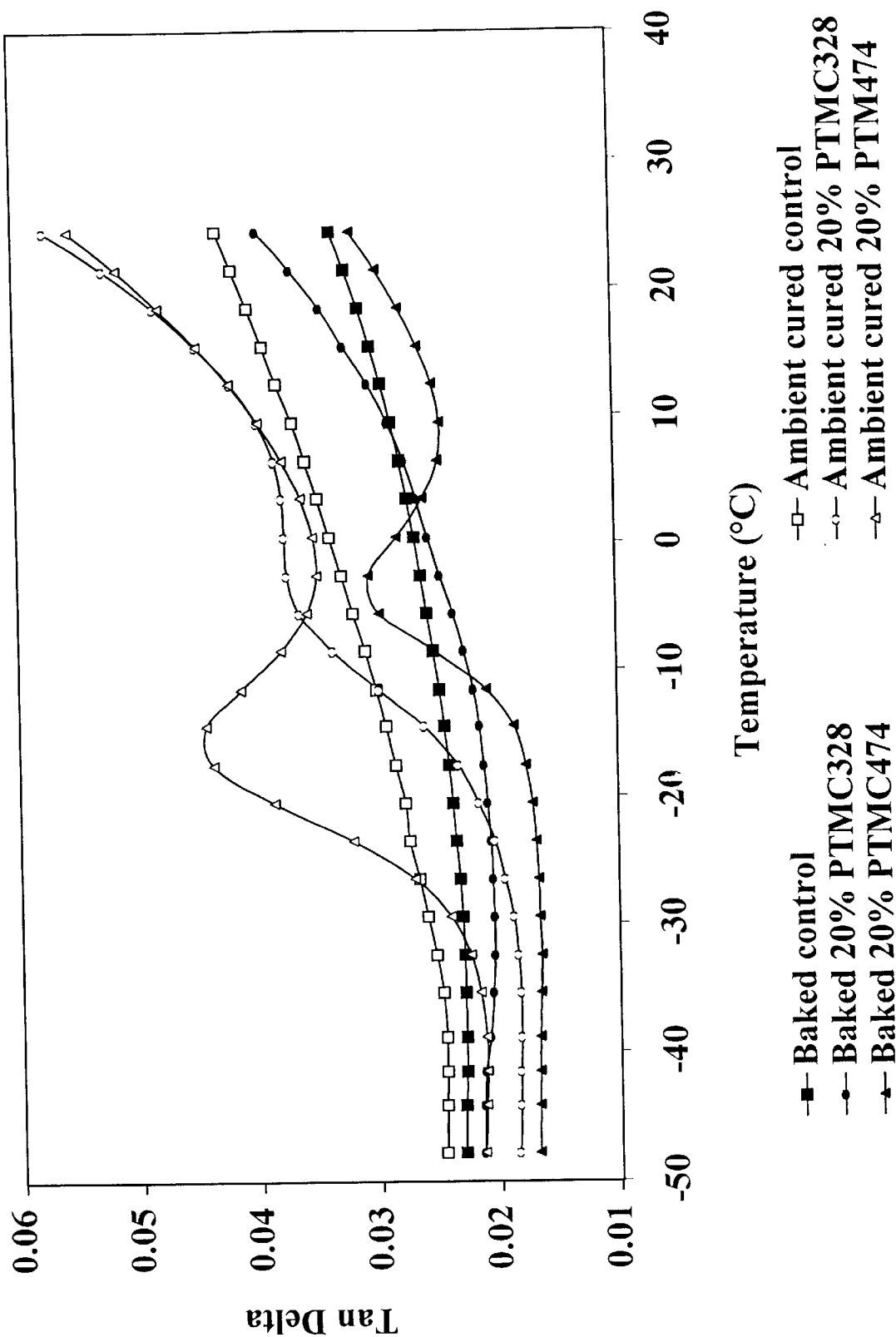
FIG. 6 is a graph showing the effect of curing conditions on damping-temperature curves of diol modified coatings.

PTMC triols were clearly more compatible with acrylic polyols than the diols at similar molecular weights. FIG. 5 illustrates the damping-temperature curves at the low temperature range of modified coatings with PC474/PT308, the molecular weights of which are comparable. In addition, DMA studies also confirmed improved miscibility with increasing curing temperature. Curing at elevated temperatures forced improvements in compatibility over coatings cured at room temperatures.(FIG. 6)

Figure 7:
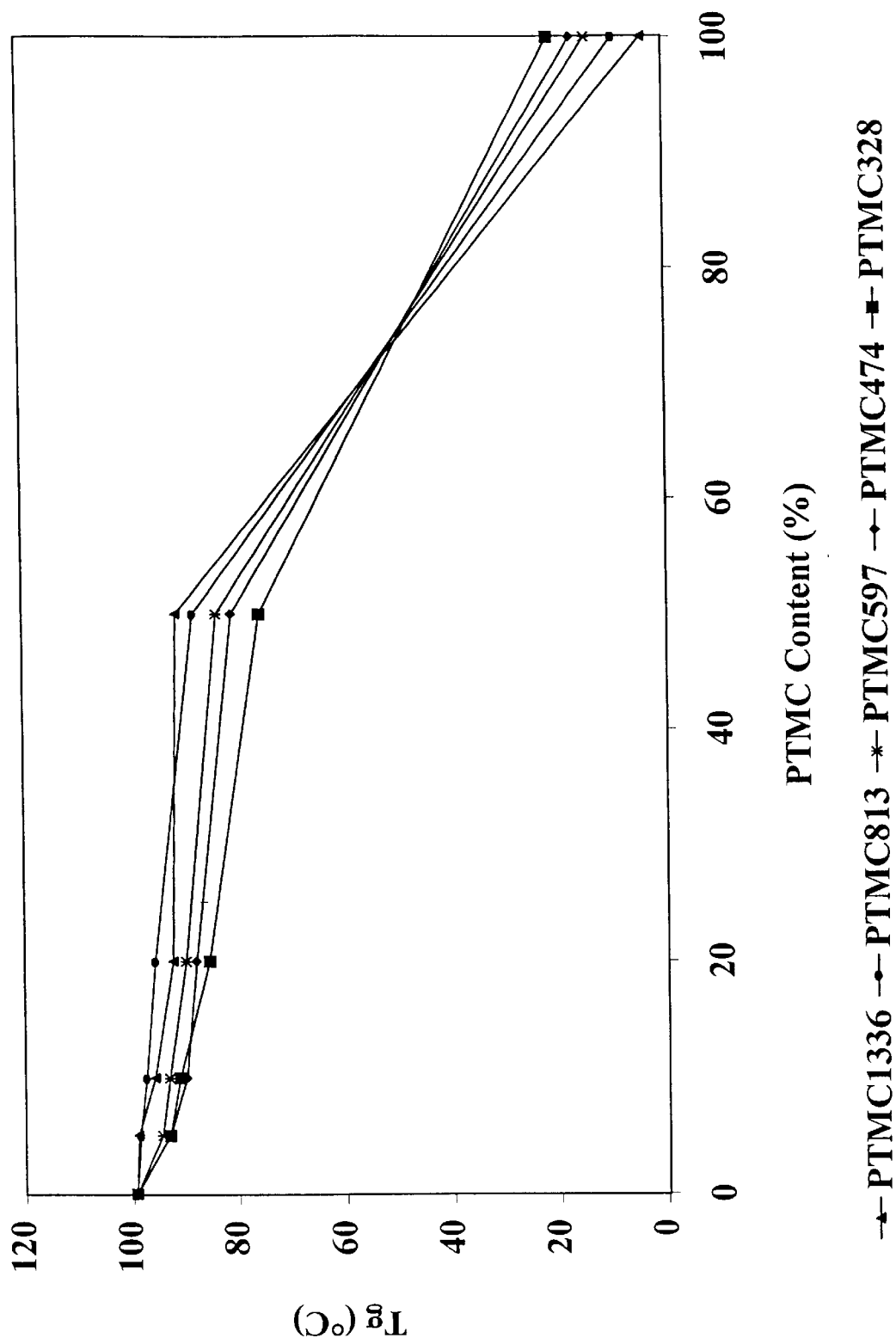
FIG. 7 is a graph showing the variation of glass transition temperature of coatings with PTMC diol content.
Figure 8:
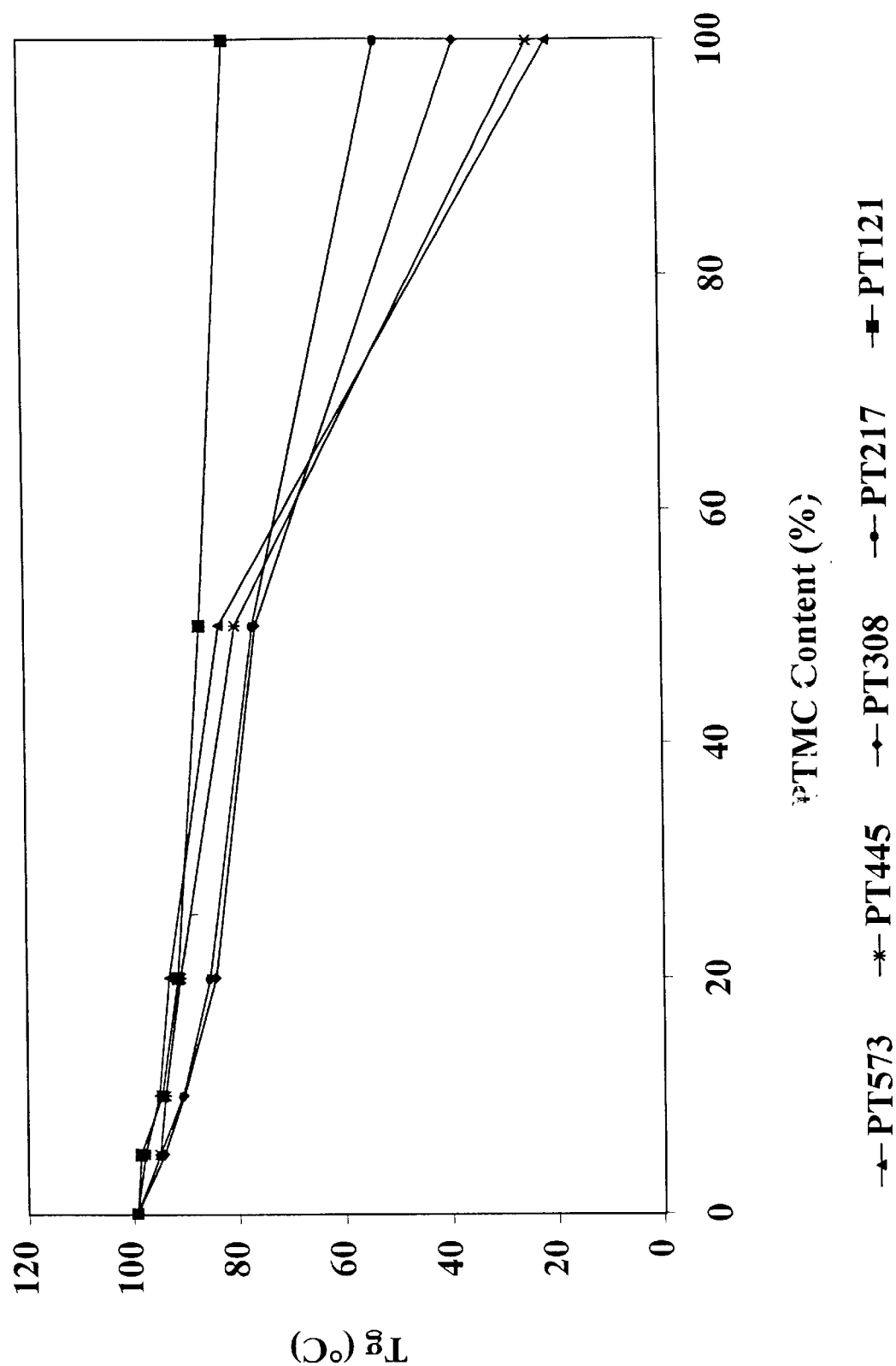
FIG. 8 is a graph showing the variation of glass transition temperature of coatings with PTMC triol content.

Incorporation of PTMC polyols also reduced the $T_g$s of the modified coatings, i.e., the relaxation at the high temperature. FIGS. 7 and 8 show the influence of the PTMC polyol molecular weights and content in the formulations on the $T_g$ of the coatings.

Low molecular weight carbonates tended to provide greater reductions in $T_g$. This effect is apparently a function of the higher compatibility of low molecular weight PTMC polyols. For triols, the medium molecular weight PT308 resulted in a greater reduction in $T_g$ than other triols. As expected, the $T_g$ of modified coatings decreased when the modifier concentration in the formulation increased.

Storage Modulus

Figure 9:
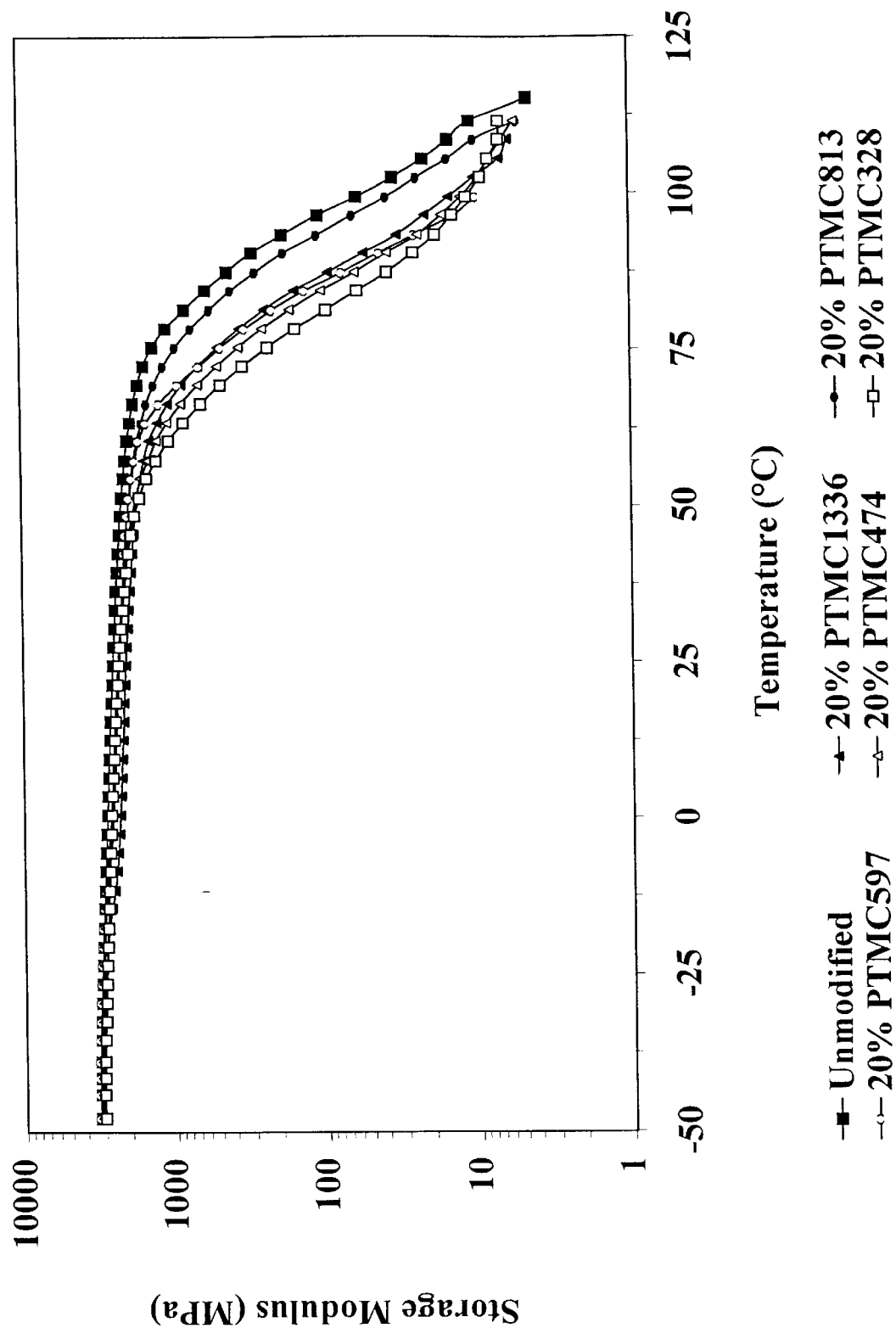
FIG. 9 is a graph showing storage modulus versus temperature curves of 20% PTMC diols modified coatings.
Figure 10:
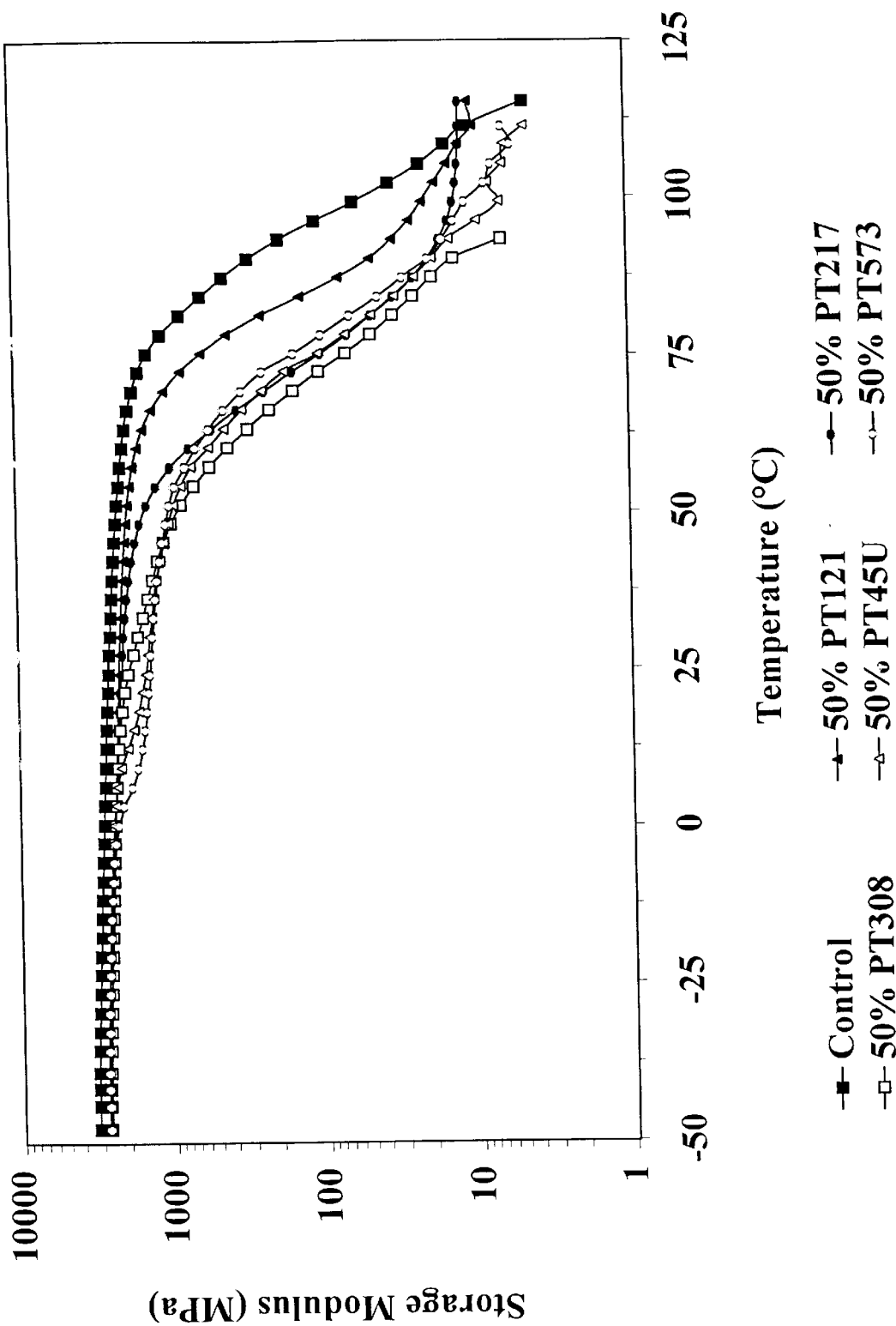
FIG. 10 is a graph showing the storage modulus versus temperature curves of 50% PTMC triols modified coatings.
Figure 11:
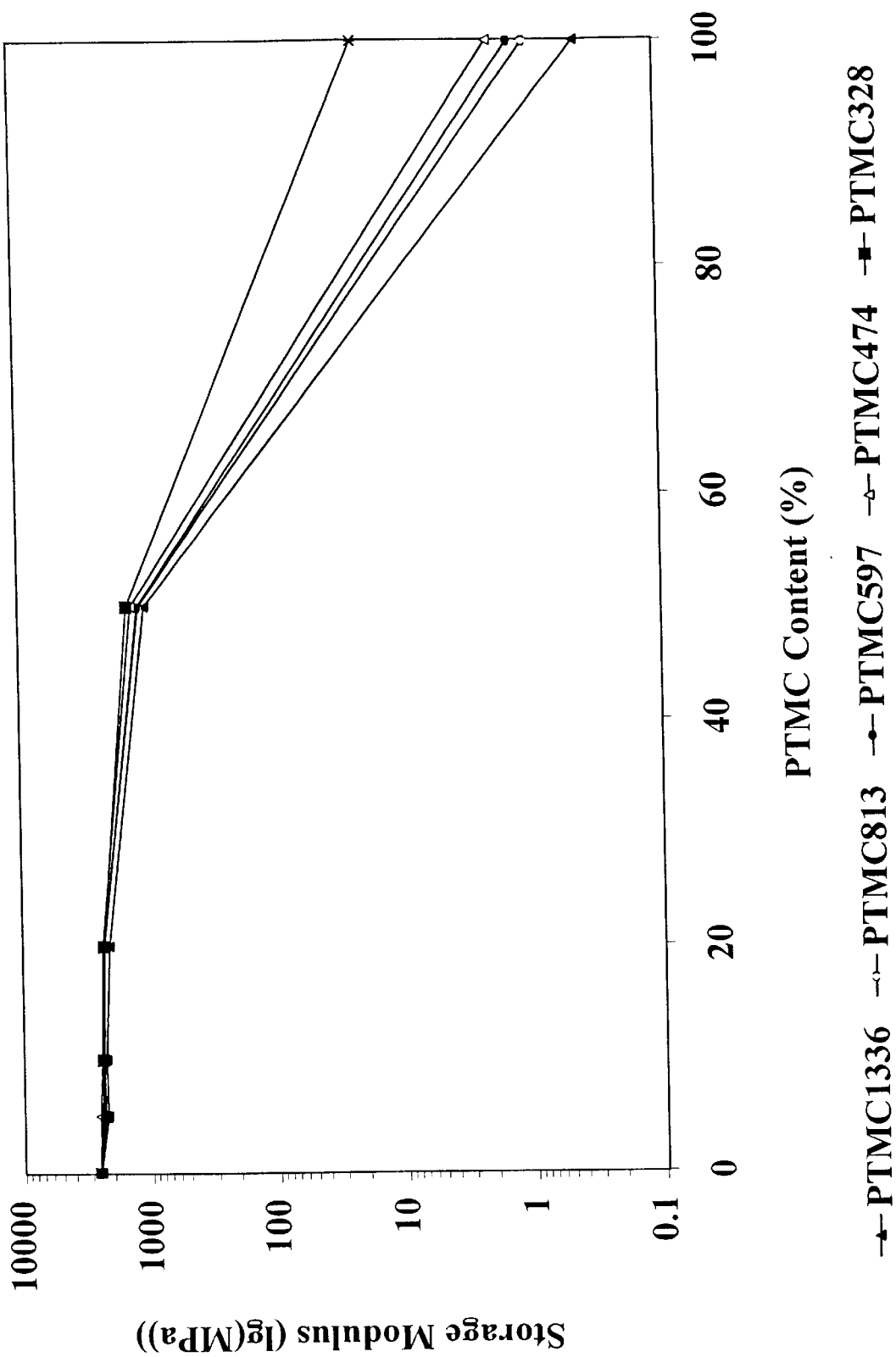
FIG. 11 is a graph showing the variation of storage modulus of urethane coatings at 25° C. with PTMC diol content.
Figure 12:
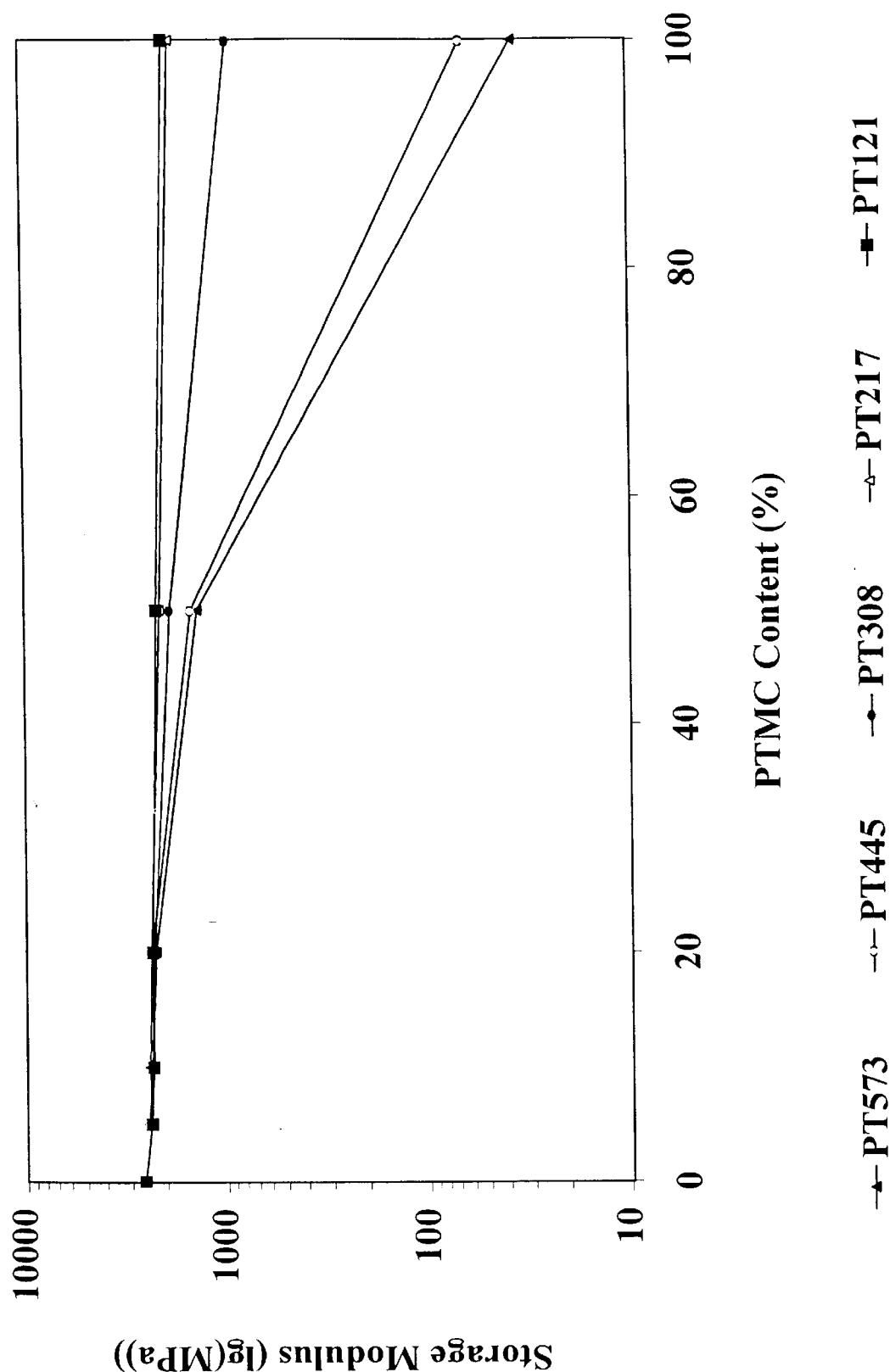
FIG. 12 is a graph showing variation of storage modulus of urethane coatings at 25° C. with PTMC triol content.

The storage modulus was also affected by the incorporation of the PTMC polyol modifiers (FIGS. 9 & 10). The general effects of PTMC diol and triol molecular weight and amount used on the storage modulus at 25° C. are illustrated in FIGS. 11 and 12. It is clear that the storage modulus at ambient temperature decreased with increasing modifier contents. However, the modulus at room temperature did not decrease much until very high modification contents, such as 50% modifiers. This was consistent with the fact that increasing modifier content did not affect the hardness when low level modifiers combined. The results also showed that molecular weight has little effect on the ambient modulus when a low level of PTMC modifiers are used.

EXAMPLE 10

Viscosity

In Example 10 the viscosity of PTMC polyol modified acrylic polyol solutions was determined on a Brookfield Viscometer at a solution concentration of 50% with PGMA/MEK (70/30) solvents. The results are shown in Table 10. They show the modification of acrylic copolymer with PTMC polyols resulted in an excellent viscosity reduction. PTMC polyols with lower molecular weights had more effect on the viscosity decline than those with higher molecular weights.

Coating viscosities were significantly reduced when as little as 5–10% of PC474 diol and PT217 triol were used and the viscosity continued to decrease as the content of PTMC polyols in the formulations was increased.

TABLE 10

Viscosity

| DIOLS | | TRIOLS | |
|---|---|---|---|
| | Viscosity (Centipoise) | | Viscosity (Centipoise) |
| Control | 885 | Control | 885 |
| 20% PC1336 | 733 | 20% PT573 | 668 |
| 20% PC813 | 631 | 20% PT445 | 610 |
| 20% PC597 | 528 | 20% PT308 | 446 |
| 5% PC474 | 646 | 5% PT217 | 696 |
| 10% PC474 | 571 | 10% PT217 | 581 |
| 20% PC474 | 417 | 20% PT217 | 402 |
| 50% PC474 | 271 | 50% PT217 | 163 |
| 20% PC328 | 376 | 20% PT121 | 379 |

EXAMPLE 11

Gloss

In Example 11 the effect of PTMC polyol modifiers on the coating gloss is evaluated. Coatings gloss over polished cold-rolled, iron phosphated and unpolished iron phosphated steel panels was influenced by the surface of the substrate. The gloss of 20% PTMC polyol modified coatings decreased compared to the control when the polished substrates were utilized (Table 11). However, the loss of gloss was small when an unpolished substrate was used.

The effect of PTMC polyol molecular weight and content in formulations on gloss at 20° and 60° is given in Table 12 for diol and triol modified coatings over polished substrates. The loss of gloss was very small for low molecular weight PTMC polyols such as PC328 diol and PT217 and PT121 triol modified coatings up to 50% PTMC. High molecular weight PTMC and PTMC content reduced gloss. The gloss reduction is likely due to the incompatibility of PTMC polyol with acrylic polyol which would be consistent with DMA studies.

TABLE 11

Effect of substrates on the gloss

| | 20°, Polished Substrate | 60°, Polished Substrate | 20°, Unpolished Substrate | 60°, Unpolished Substrate |
|---|---|---|---|---|
| Control | 104 | 120 | 88 | 97 |
| 20% PC328 | 102 | 116 | 87 | 97 |
| 20% PC474 | 95 | 104 | 87 | 96 |
| 20% PC597 | 91 | 99 | 88 | 96 |
| 20% PC813 | 89 | 97 | 86 | 95 |
| 20% PC1336 | 81 | 95 | 80 | 94 |

TABLE 12

Gloss of modified coatings

| | Gloss, 20° | Gloss, 60° | | Gloss, 20° | Gloss, 60° |
|---|---|---|---|---|---|
| Control | 104 | 120 | Control | 104 | 123 |
| 5% PC328 | 106 | 123 | 5% PT121 | 108 | 124 |
| 10% PC328 | 102 | 119 | 10% PT121 | 108 | 125 |
| 20% PC328 | 102 | 116 | 20% PT121 | 108 | 126 |
| 50% PC328 | 94 | 110 | 50% PT121 | 108 | 125 |
| 5% PC474 | 103 | 118 | 5% PT217 | 108 | 126 |
| 10% PC474 | 102 | 115 | 10% PT217 | 108 | 125 |
| 20% PC474 | 95 | 104 | 20% PT217 | 107 | 123 |
| 50% PC474 | 81 | 93 | 50% PT217 | 105 | 121 |
| 5% PC597 | 103 | 117 | 5% PT308 | 105 | 121 |
| 20% PC597 | 91 | 99 | 20% PT308 | 102 | 114 |
| 5% PC813 | 101 | 113 | 5% PT445 | 102 | 119 |
| 20% PC813 | 89 | 97 | 20% PT445 | 96 | 114 |
| 5% PC1336 | 96 | 107 | 5% PT573 | 99 | 113 |
| 20% PC1336 | 81 | 95 | 20% PT573 | 92 | 104 |

EXAMPLE 12

In Example 12 formulations containing varying percentages of the different PTMC diols and triols were exposed to 10% HCl, 10% NaOH, gasoline, and mustard for 24 hours. The data are shown in Table 13, where no effect is expressed with a rating of 10 and the most severe deterioration with a rating of 1. The data indicate the coatings had inherently excellent acid and caustic resistance. PTMC modified coatings had good gasoline resistance as compared to the control.

Stain resistance was not only connected to the chemical resistance but also to the hardness of the coatings. Soft coatings tended to stain more than hard coatings.

Consequently, modified coatings with 5, 10, or 20% PTMC polyol had good stain resistance compared to the control as there was little difference in hardness, while coatings containing 50% PTMC polyol exhibited less resistance. PTMC polyol coatings had less stain resistance since they were very flexible. In addition, low molecular weight PTMC polyol coatings provided better resistance due to their higher $T_g$ and modulus.

TABLE 13

Chemical and Stain Resistance of Polyurethane Coatings

| Sample | HCl | NaOH | Gas. | Mustard |
|---|---|---|---|---|
| Control | 10 | 10 | 9 | 10 |
| PC1336 | 10 | 10 | 9 | 1 |
| PC813 | 10 | 10 | 9 | 2 |
| PC597 | 10 | 10 | 9 | 4 |
| PC474 | 10 | 10 | 9 | 4 |
| PC328 | 10 | 10 | 9 | 5 |
| 20% PC1336 | 10 | 10 | 9 | 10 |
| 20% PC813 | 10 | 10 | 9 | 10 |
| 20% PC597 | 10 | 10 | 9 | 10 |
| 20% PC474 | 10 | 10 | 9 | 10 |
| 20% PC328 | 10 | 10 | 9 | 10 |
| 50% PC1336 | 10 | 10 | 9 | 9 |
| 10% PC1336 | 10 | 10 | 9 | 10 |
| 5% PC1336 | 10 | 10 | 9 | 10 |
| 50% PC597 | 10 | 10 | 9 | 8 |
| 10% PC597 | 10 | 10 | 9 | 10 |
| 5% PC597 | 10 | 10 | 9 | 10 |
| 50% PC328 | 10 | 10 | 9 | 8 |
| 10% PC328 | 10 | 10 | 9 | 10 |
| 10% PC328 | 10 | 10 | 9 | 10 |
| PT573 | 10 | 10 | 9 | 1 |
| PT445 | 10 | 10 | 9 | 2 |
| PT308 | 10 | 10 | 9 | 4 |
| PT217 | 10 | 10 | 9 | 4 |
| PT121 | 10 | 10 | 9 | 5 |
| 20% PT572 | 10 | 10 | 9 | 10 |
| 20% PT445 | 10 | 10 | 9 | 10 |
| 20% PT308 | 10 | 10 | 9 | 10 |
| 20% PT217 | 10 | 10 | 9 | 10 |
| 20% PT121 | 10 | 10 | 9 | 10 |
| 50% PT573 | 10 | 10 | 9 | 9 |
| 10% PT573 | 10 | 10 | 9 | 10 |
| 5% PT573 | 10 | 10 | 9 | 10 |
| 50% PT308 | 10 | 10 | 9 | 8 |
| 10% PT308 | 10 | 10 | 9 | 10 |
| 5% PT308 | 10 | 10 | 9 | 10 |
| 50% PT121 | 10 | 10 | 9 | 8 |
| 10% PT121 | 10 | 10 | 9 | 10 |
| 5% PT121 | 10 | 10 | 9 | 10 |

TABLE 13-continued

Chemical and Stain Resistance of Polyurethane Coatings

| Sample | HCl | NaOH | Gas. | Mustard |
|---|---|---|---|---|
| 5% PT121 | 10 | 10 | 9 | 10 |

EXAMPLE 13

In Example 13 all the modified and control coatings were subjected to double rubs. All of the coatings had good MEK double rubs resistance. The coatings passed over 200 double rubs without failure except for the high molecular weight PC1336 diol modified coatings containing 50% PTMC polyol. Results are shown in Table 14.

TABLE 14

MEK Double Rubs Resistance of the Modified Coatings

| PTMC polyol Content | PC1336 | PC813 | PC597 | PC474 | PC328 |
|---|---|---|---|---|---|
| Control | >200 | >200 | >200 | >200 | >200 |
| 5% | >200 | >200 | >200 | >200 | >200 |
| 10% | >200 | >200 | >200 | >200 | >200 |
| 20% | >200 | >200 | >200 | >200 | >200 |
| 50% | 190 | 200 | 200 | >200 | >200 |

| PTMC polyol Content | PT573 | PT445 | PT308 | PT217 | PT121 |
|---|---|---|---|---|---|
| Control | >200 | >200 | >200 | >200 | >200 |
| 5% | >200 | >200 | >200 | >200 | >200 |
| 10% | >200 | >200 | >200 | >200 | >200 |
| 20% | >200 | >200 | >200 | >200 | >200 |
| 50% | >200 | >200 | >200 | >200 | >200 |

EXAMPLE 14

In Example 14 the PTMC polyol/acrylic modified coatings and control were exposed to color and Q-UV tests. Data are shown in Table 15. Q-UV exposure revealed no appreciable color change for the PTMC polyol/acrylic modified coatings or the control. Gloss retention was also very good for low molecular weight PTMC polyol modified coatings compared to the control. Exposures were conducted with UVA 340 light bulbs at 60° for 500 hours with no humidity cycle in accordance with ASTM D4587-91. All the coating films were cured at 140° C. for 20 minutes using polished iron phosphated steel panels (Q Panel S-361) substrates. In addition, the PTMC polyol modifiers exhibited less yellowing than the control.

TABLE 15

UV Resistance of Polyurethane Control and Modified Coatings

| | Color | | Q-UV Test | | | |
|---|---|---|---|---|---|---|
| Sample | Color B | Yellowness Index | Color B Change | YI Change | Gloss Retention | Gloss Retention |
| Control | 4.97 | 11.0 | 0.72 | 1.61 | 99% | 99% |
| 20% PC328 | 4.76 | 10.56 | 0.66 | 1.58 | 99% | 99% |
| 5% PT474 | 4.57 | 10.14 | 0.62 | 1.4 | 99% | 99% |

TABLE 15-continued

UV Resistance of Polyurethane Control and Modified Coatings

| | Color | | Q-UV Test | | | |
|---|---|---|---|---|---|---|
| Sample | Color B | Yellowness Index | Color B Change | YI Change | Gloss Retention | Gloss Retention |
| 10% PT474 | 4.52 | 10.00 | 0.68 | 1.56 | 99% | 99% |
| 20% PC474 | 4.49 | 10.23 | 0.71 | 1.65 | 97% | 99% |
| 5% PC597 | 4.82 | 10.73 | 0.72 | 1.61 | 99% | 99% |
| 10% PC597 | 4.7 | 10.22 | 0.68 | 1.65 | 99% | 99% |
| 20% PC507 | 4.56 | 10.21 | 0.62 | 1.42 | 97% | 99% |
| 20% PC813 | 4.36 | 9.69 | 0.72 | 1.63 | 96% | 99% |
| 20% PC1336 | 4.29 | 9.57 | 0.62 | 1.42 | 91% | 98% |
| 20% PT121 | 4.81 | 10.56 | 0.71 | 1.65 | 99% | 99% |
| 20% 217 | 4.82 | 10.65 | 0.77 | 1.80 | 99% | 99% |
| 20% PT308 | 4.76 | 10.56 | 0.77 | 1.78 | 99% | 99% |

EXAMPLE 15

In Example 15 pigmented coatings were prepared as white topcoats based in $TiO_2$ from DuPont with a combination of 20% PTMC597 and Joncryl 587 acrylic polyol as the binder. Urethane coatings were formulated at a total ratio of NCO/OH of 1.05/1 and a pigment/binder ratio of 0.7/1. The coatings were baked at 140° C. for 20 minutes. The coating could be cured at ambient temperature for at least two weeks with similar results. Results are shown in Table 16:

PTMC polyol modification improved the flexibility of pigmented polyurethane coatings while maintaining the ultimate hardness, chemical and stain resistance. The modifiers also provided improved yellowing resistance for the pigmented urethane coatings, as well as providing very good UV resistance properties compared to the control. Therefore, the PTMC polyols had a similar effect on the pigmented urethane coatings as with the clear coatings;

We claim:

1. Acrylic polyurethane coating compositions characterized by improved impact resistance made by combining the following materials together at the same time:
   a) a polyol having an equivalent weight of about 300–1300;
   b) said polyol having incorporated therein 2 to 50% by weight of a polytrimethylene carbonate polyol; and
   c) a polyisocyanate crosslinking agent.

2. The composition of claim 1 wherein the polytrimethylene carbonate polyol is selected from polytrimethylene carbonate diol and polytrimethylene carbonate triol.

3. The composition of claim 1 wherein the polyol is selected from the group consisting of polyester polyols and acrylic polyols.

4. The composition of claim 3 wherein the acrylic polyol is selected from the group consisting of copolymers of one or more alkyl esters of acrylic acid or methacrylic acid optionally together with one or more other polymerizable ethylenically unsaturated monomers.

5. The composition of claim 4 wherein the suitable alkyl esters of acrylic acid or methacrylic acid are selected from the group consisting of methyl methacrylate, ethyl methacrylate, butyl methacrylate, ethyl acrylate, butyl acrylate, and 2-ethyl hexyl acrylate.

6. The composition of claim 4 wherein the copolymerizable ethylenically unsaturated monomers are selected from the group consisting of vinyl aromatic compounds, nitrites, vinyl and vinylidene halides, and vinyl esters.

7. The composition of claim 6 further comprising the use of suitable functional monomers for crosslinking purposes selected from the group consisting of acrylic acid, methacrylic acid, hydroxyalkyl acrylates, and hydroxyalkyl methacrylates.

8. The composition of claim 3 wherein the polyol is selected from acrylic polyols having an equivalent weight in the range of 300 to 1300.

9. The composition of claim 8 further comprising an acrylic polyol having a hydroxyl number in the range of 80–140 and an equivalent weight in the range of 400 to 700.

10. The composition of claim 1 further comprising the acrylic polyol dissolved in a solvent selected from the group consisting of esters, ketones, and glycol ethers and esters.

11. The composition of claim 10 wherein the solvent is selected from the group consisting of butyl acetate, n-propyl acetate, methyl ethyl ketone, methyl n-propyl ketone,

TABLE 16

Properties of PTMC Modified Pigmented Urethane Coatings

| Sample | Pencil Hardness | Adhesion | Front Impact (in-lb) | Reverse Impact (in-lb) | Humidity Resistance (hours) | 24-Hour Spot Test | | | |
|---|---|---|---|---|---|---|---|---|---|
| | | | | | | HCl | NaOH | Gasoline | Mustard |
| Control | H | 5B | 24 | 8 | >1000 | 10 | 10 | 9 | 10 |
| 200% PC597 | H | 5B | 80 | 50 | >1000 | 10 | 10 | 9 | 10 |

| Sample | Color B | Yellowness Index | Gloss 20° | Gloss 60° | MEK Double Rubs | Q-UV Test | | | |
|---|---|---|---|---|---|---|---|---|---|
| | | | | | | Gloss 20° | Gloss 60° | Color B Change | YI Change |
| Control | −.067 | −1.05 | 73 | 87 | >200 | 70 | 86 | 0.16 | 0.25 |
| 20% PC597 | −0.81 | −1.26 | 70 | 86 | >200 | 69 | 85 | 0.07 | 0.10 | methyl amyl ketone, propylene glycol methyl ether acetate, ethylene glycol methyl ether acetate, and ethylene glycol diacetate.

12. The composition of claim 11 wherein the solvent is selected from glycol ethers and glycol esters and combinations thereof.

13. The composition of claim 12 wherein the solvent is propylene glycol methyl ether acetate.

14. The composition of claim 10 further comprising the use of a co-solvent.

15. The composition of claim 14 wherein the co-solvent is methyl ethyl ketone (MEK).

16. The composition of claim 1 further comprising an organometallic catalyst used to accelerate the formation of the composition.

17. The composition of claim 16 wherein the catalyst is selected from the group consisting of stannous octoate, dibutyl tin dilaurate, sodium acetate, and dibutyl di(lauryl mercapto)tin.

18. The composition of claim 1 wherein the polyisocyanate crosslinking agent is a trifunctional isocyanate.

19. The composition of claim 18 wherein the trifunctional isocyanate is a trimer of hexamethylene diisocyanate.

20. The composition of claim 1 wherein a pigment is used selected from those known in the art.

21. The composition of claim 20 wherein the pigment is titanium dioxide.

22. An acrylic polyurethane coating composition characterized by high impact resistance and high gloss made by combining the following materials together at the same time:

a) An acrylic polyol having an equivalent weight in the range of 300 to 1300 dissolved in a suitable solvent to 40–70% solids;

b) Said acrylic polyol having substituted therein 5 to 20% by weight of a polytrimethylene carbonate polyol selected from a polytrimethylene carbonate diol and polytrimethylene carbonate triol; and c) A trifunctional isocyanate.

23. The composition of claim 22 wherein the solvent is propylene glycol methyl ether acetate.

24. The composition of claim 22 further comprising a methyl ethyl ketone co-solvent.

25. Any article coated with the composition of claim 22.

* * * * *